United States Patent
La et al.

(10) Patent No.: US 10,306,397 B2
(45) Date of Patent: May 28, 2019

(54) METHOD FOR AUTOMATICALLY CONNECTING A SHORT-RANGE COMMUNICATION BETWEEN TWO DEVICES AND APPARATUS FOR THE SAME

(71) Applicant: LG ELECTRONICS INC., Seoul (KR)

(72) Inventors: Taeksu La, Seoul (KR); Cheolkeon Jin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 4 days.

(21) Appl. No.: 15/542,033

(22) PCT Filed: Feb. 11, 2015

(86) PCT No.: PCT/KR2015/001387
§ 371 (c)(1),
(2) Date: Jul. 6, 2017

(87) PCT Pub. No.: WO2016/114442
PCT Pub. Date: Jul. 21, 2016

(65) Prior Publication Data
US 2017/0374487 A1  Dec. 28, 2017

(30) Foreign Application Priority Data
Jan. 16, 2015 (KR) .................. 10-2015-0008014

(51) Int. Cl.
| | | |
|---|---|---|
| *H04W 4/00* | (2018.01) | |
| *H04W 76/10* | (2018.01) | |
| *H04W 88/02* | (2009.01) | |
| *H04W 52/02* | (2009.01) | |
| *H04W 4/80* | (2018.01) | |

(52) U.S. Cl.
CPC ............ *H04W 4/00* (2013.01); *H04W 4/80* (2018.02); *H04W 52/0235* (2013.01);
(Continued)

(58) Field of Classification Search
CPC ..... H04W 4/00; H04W 4/80; H04W 52/0235; H04W 76/02; H04W 76/10; H04W 88/02; (Continued)

(56) References Cited

U.S. PATENT DOCUMENTS 8,605,634 B2 * 12/2013 Jeon ............ H04W 74/002
370/310
2006/0075269 A1 * 4/2006 Liong ............ G06F 1/3209
713/300

(Continued)

FOREIGN PATENT DOCUMENTS

| KR | 10-2013-0008172 A | 1/2013 |
| KR | 10-2013-0056404 A | 5/2013 |
| KR | 10-2014-0033653 A | 3/2014 |

Primary Examiner — Wutchung Chu
(74) Attorney, Agent, or Firm — Birch, Stewart, Kolasch & Birch, LLP

(57) ABSTRACT

A method for automatically connecting two devices with each other through short-range communication an apparatus for the same are disclosed. The apparatus comprises a short-range communication module configured to enable short-range communication with an external device; an interrupt detector configured to sense an interrupt signal for short-range communication connection, which is received from the external device through the short-range communication module in a sleep mode where a standby power is supplied; and a controller, the interrupt detector wakes up the controller if the interrupt signal is sensed in the sleep mode, and the woken-up controller releases the sleep mode and controls the short-range communication module to perform short-range communication connection with the external device.

19 Claims, 11 Drawing Sheets

(52) U.S. Cl.
CPC ............ *H04W 76/10* (2018.02); *H04W 88/02* (2013.01); *Y02D 70/00* (2018.01); *Y02D 70/1244* (2018.01); *Y02D 70/1246* (2018.01); *Y02D 70/1262* (2018.01); *Y02D 70/1264* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01); *Y02D 70/168* (2018.01); *Y02D 70/26* (2018.01)

(58) Field of Classification Search
CPC ............ Y02D 70/1244; Y02D 70/1246; Y02D 70/1262; Y02D 70/1264; Y02D 70/142; Y02D 70/144; Y02D 70/146; Y02D 70/162; Y02D 70/164; Y02D 70/166; Y02D 70/168; Y02D 70/26
See application file for complete search history.

(56) References Cited

U.S. PATENT DOCUMENTS

| | | | |
|---|---|---|---|
| 2006/0101109 A1* | 5/2006 | Nishio | H04L 12/12 709/200 |
| 2008/0037485 A1* | 2/2008 | Osinga | H04L 45/00 370/338 |
| 2010/0097969 A1* | 4/2010 | De Kimpe | H04W 52/0216 370/311 |
| 2011/0164595 A1* | 7/2011 | So | H04W 12/06 370/338 |
| 2013/0097446 A1* | 4/2013 | Bernard | H04L 12/2834 713/323 |
| 2013/0107775 A1* | 5/2013 | Cho | H04W 52/0235 370/311 |
| 2013/0129109 A1* | 5/2013 | Jung | H04R 1/1041 381/74 |
| 2014/0173304 A1* | 6/2014 | Rahman | H04L 12/6418 713/310 |
| 2014/0254818 A1* | 9/2014 | Tse | H04R 1/1041 381/74 |
| 2015/0312857 A1* | 10/2015 | Kim | H04W 52/0222 370/311 |
| 2016/0070718 A1* | 3/2016 | Lee | H04L 12/2803 707/610 |
| 2017/0181090 A1* | 6/2017 | Park | H04W 52/0235 |
| 2018/0124704 A1* | 5/2018 | Jung | H04W 52/0229 |

\* cited by examiner

[Fig. 1]
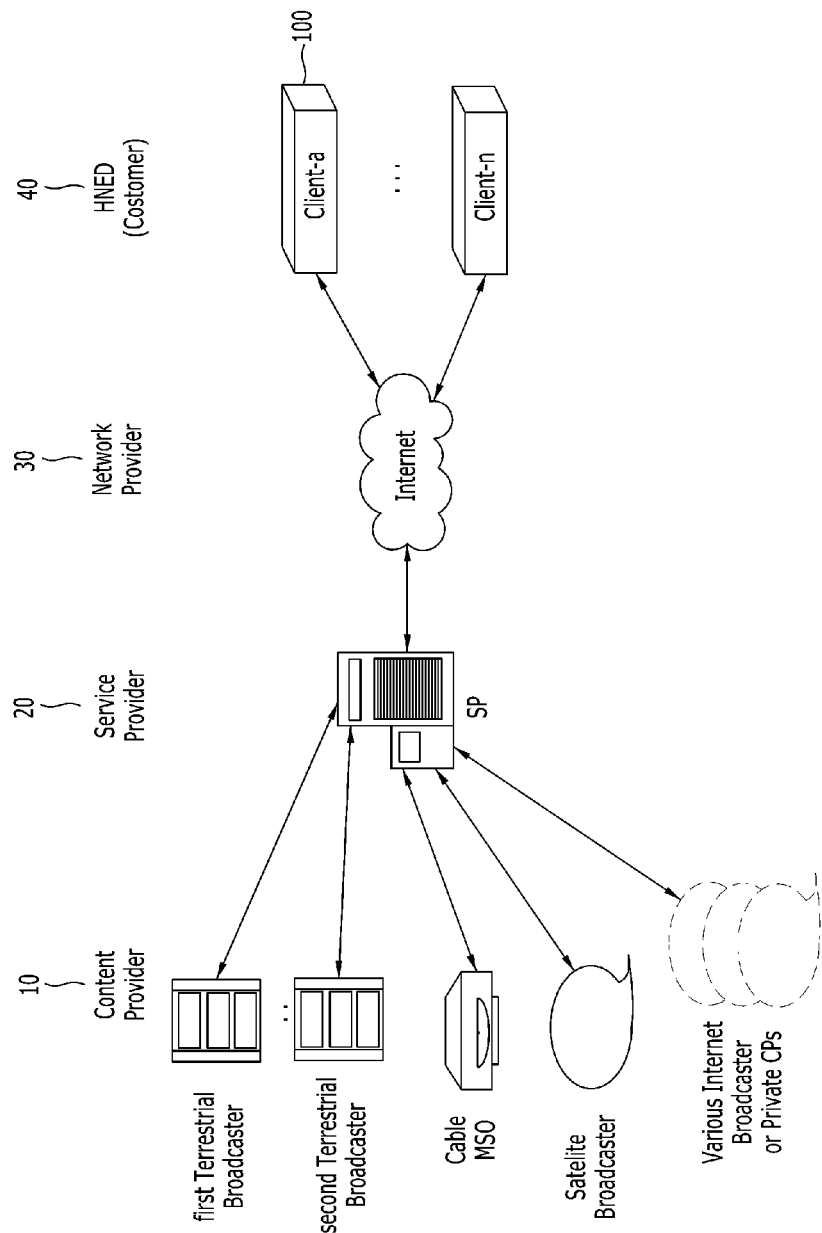

[Fig. 2]
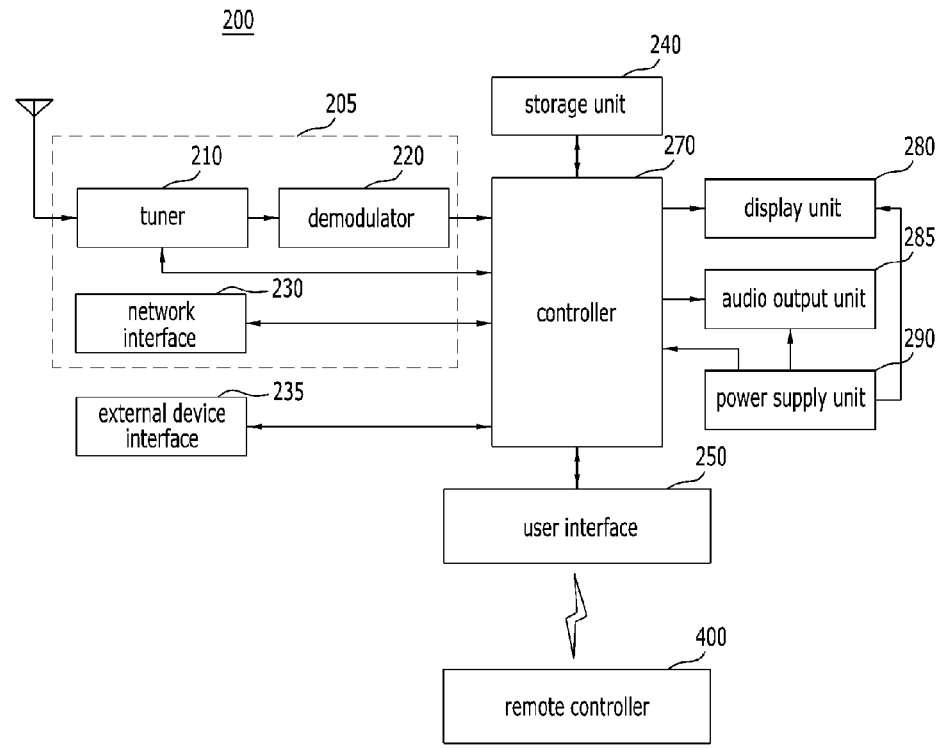
[Fig. 3]
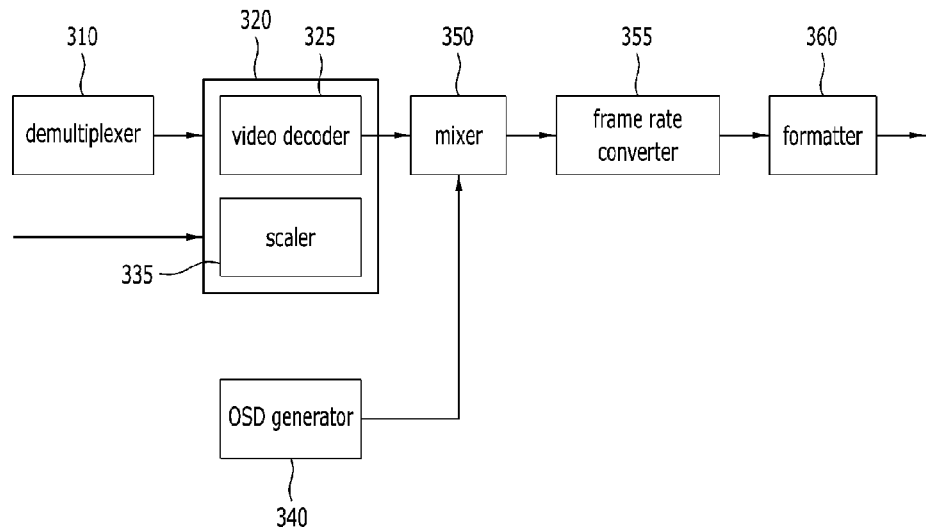

[Fig. 4]
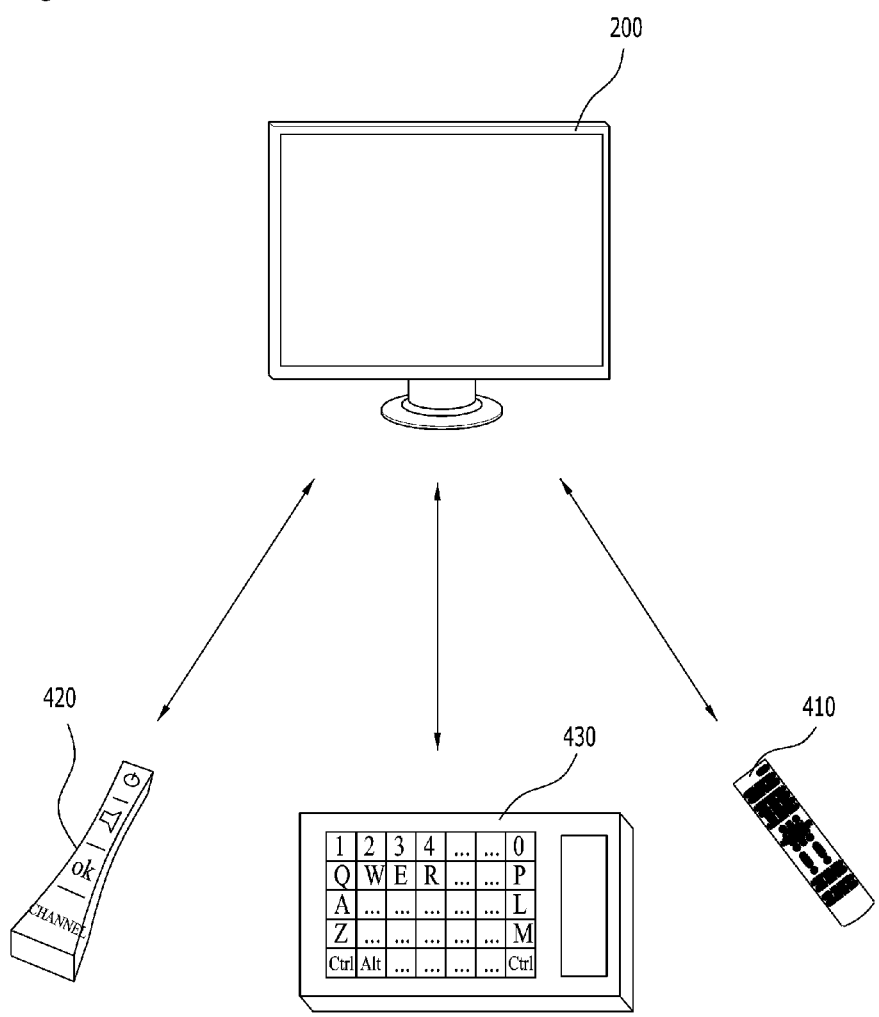

[Fig. 5]
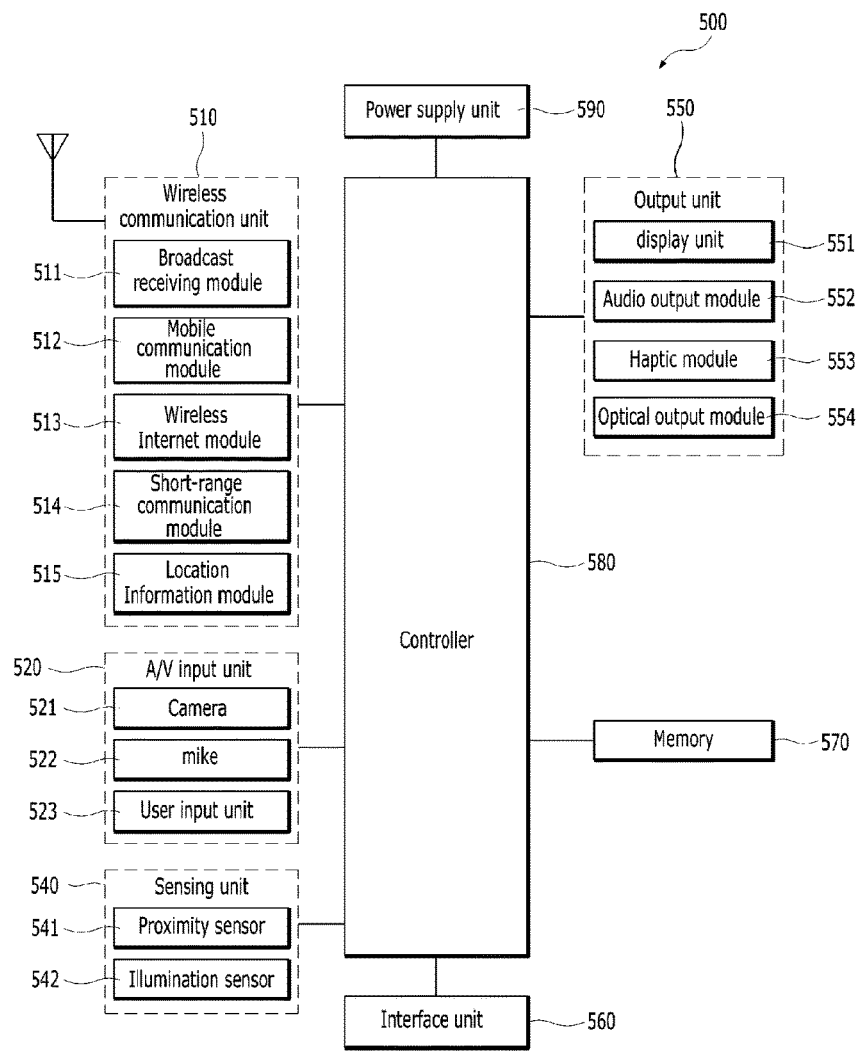
[Fig. 6]
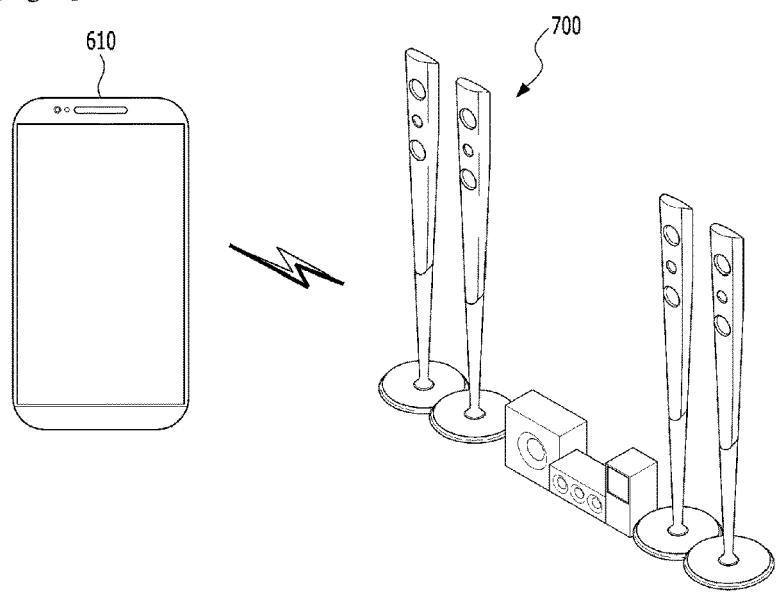

[Fig. 7a]
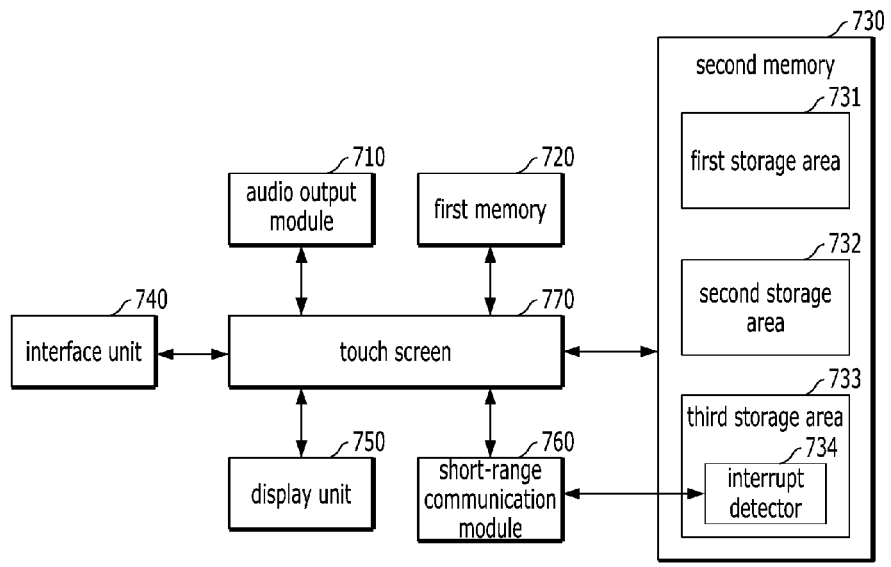
[Fig. 7b]
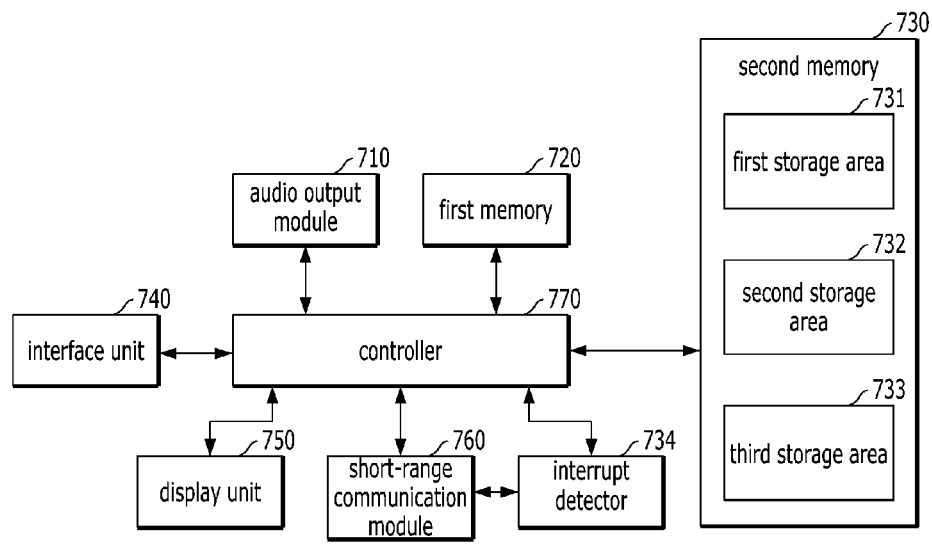

[Fig. 8]
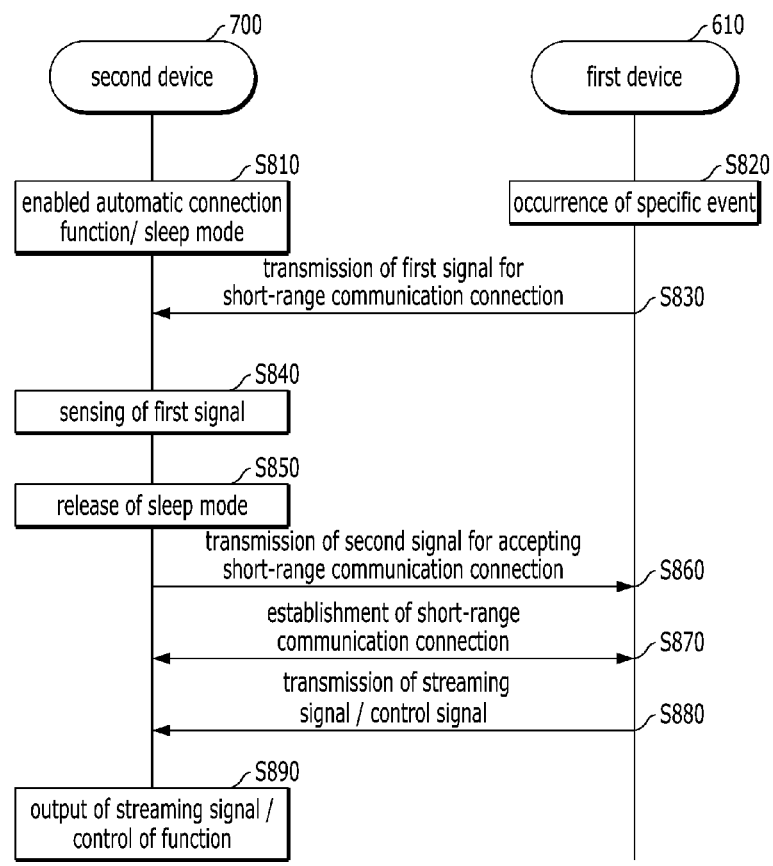
[Fig. 9]
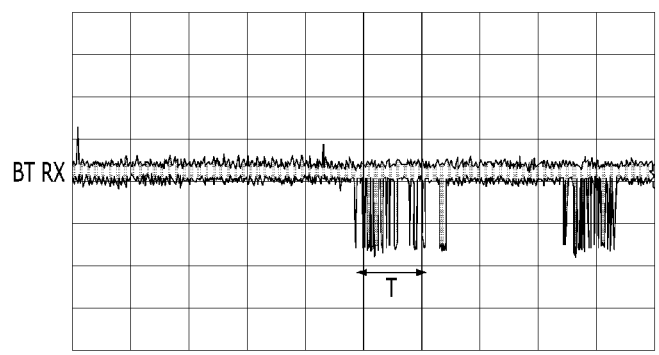

[Fig. 10]
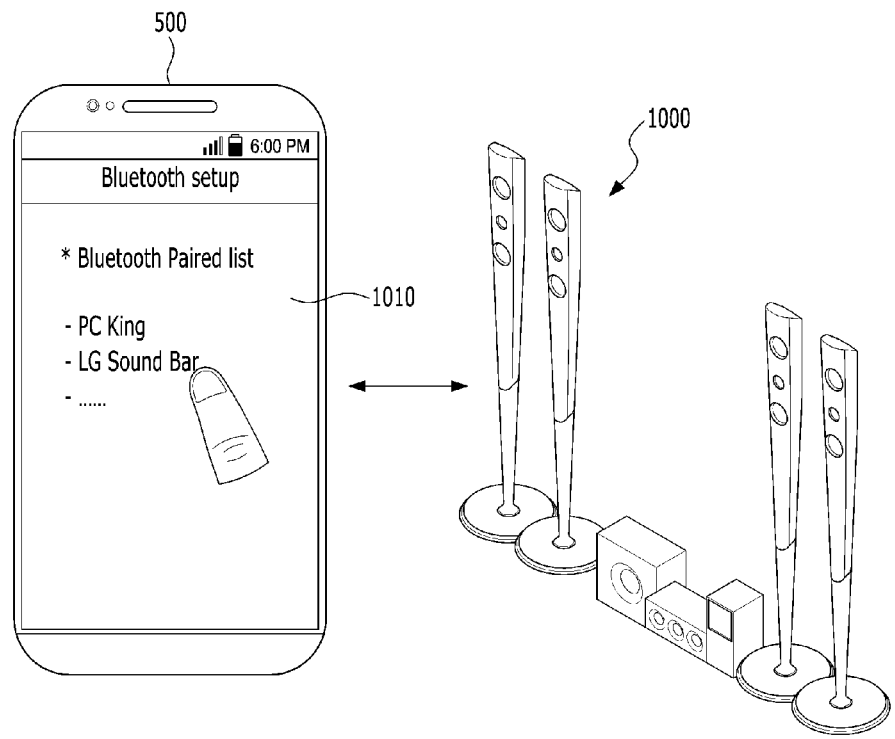
[Fig. 11]
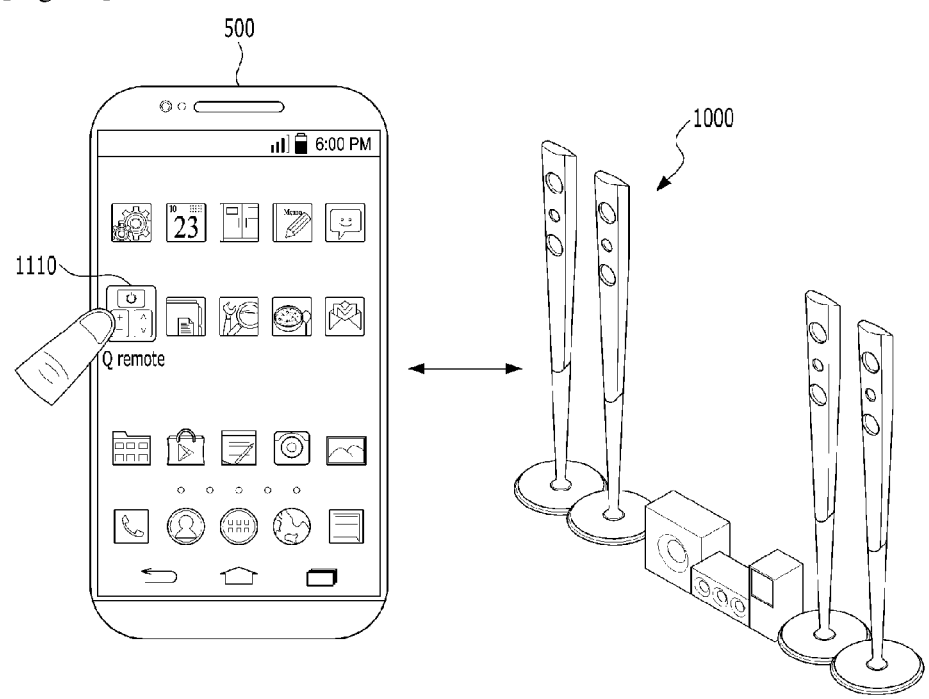

[Fig. 12]
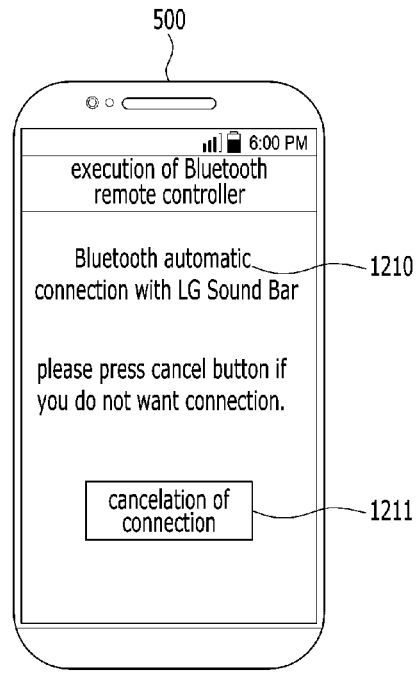
[Fig. 13]
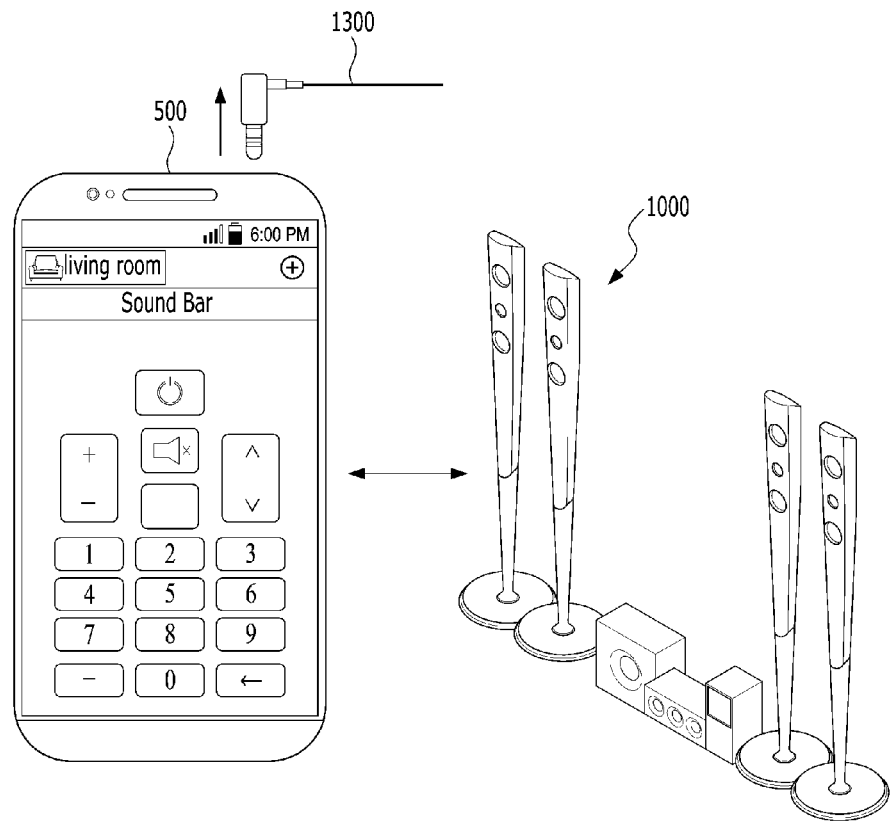

[Fig. 14]
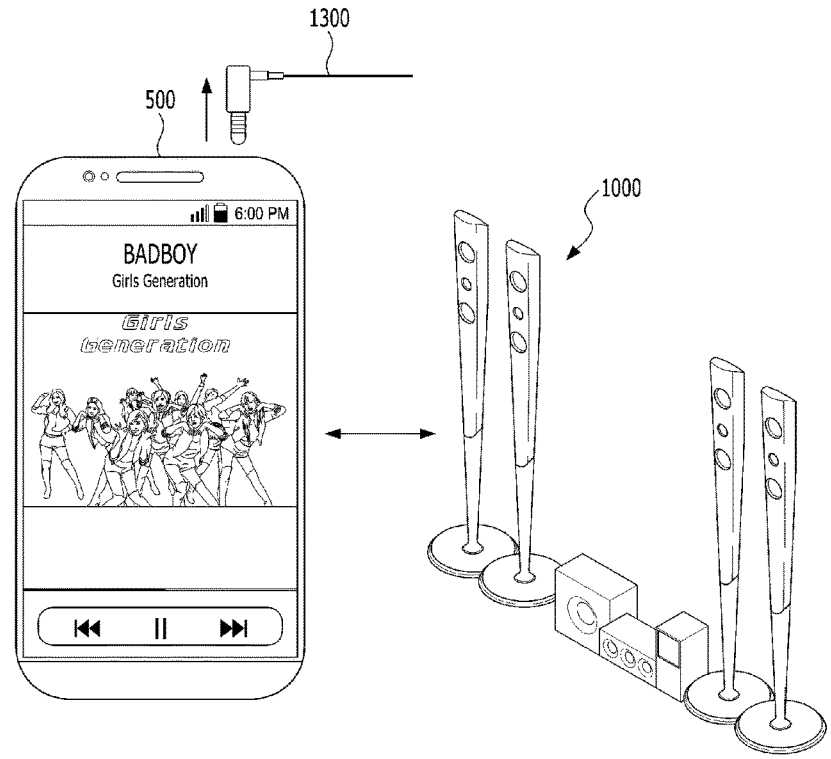
[Fig. 15]
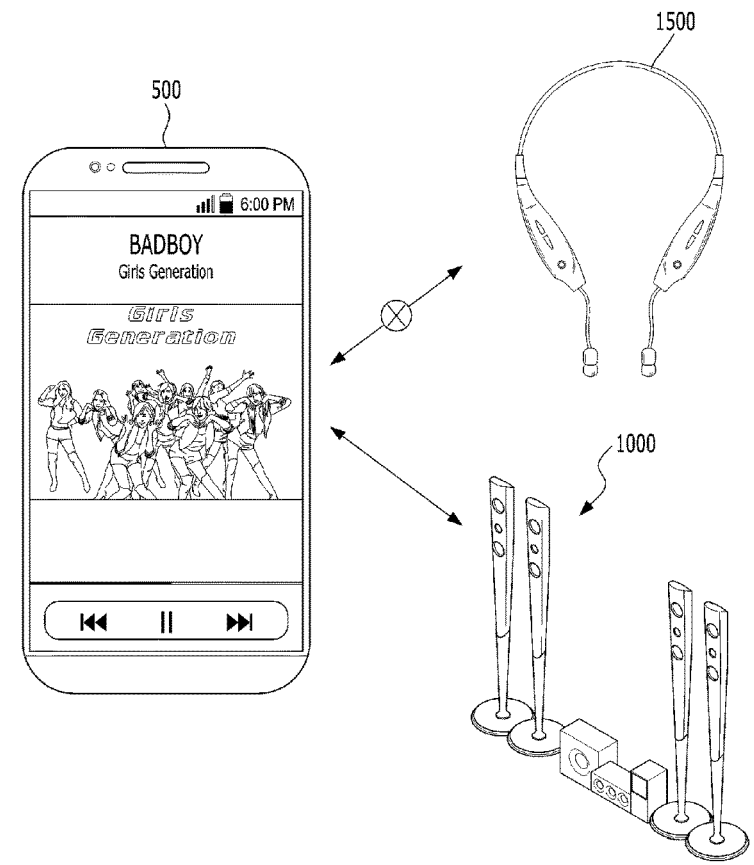

[Fig. 16]
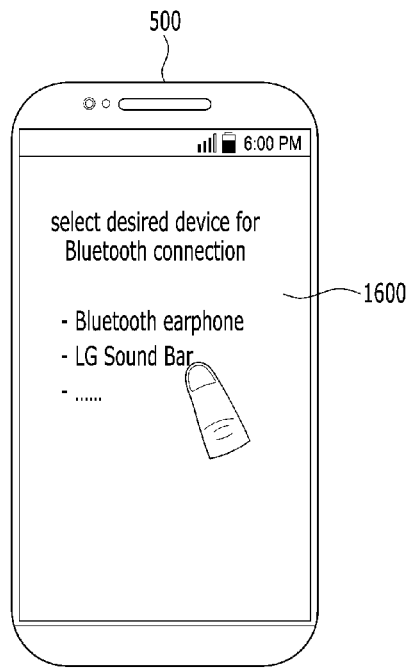
[Fig. 17]
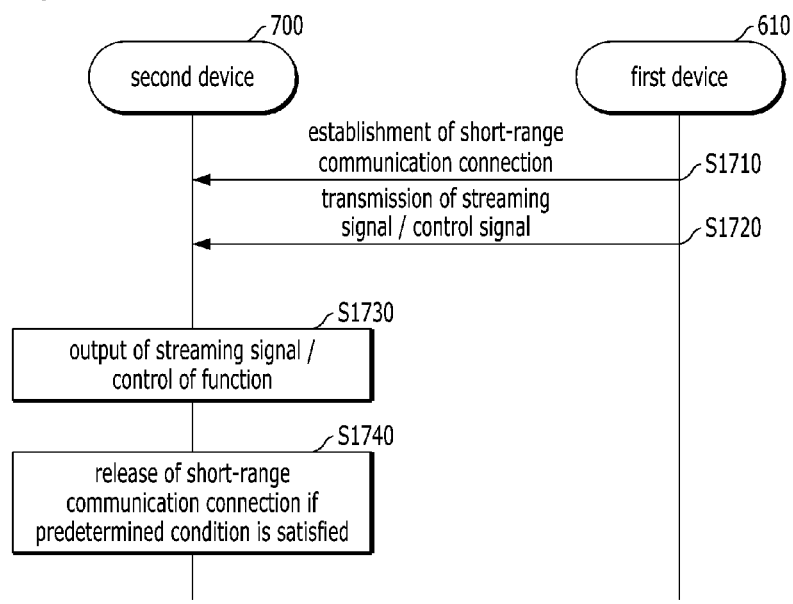

[Fig. 18]
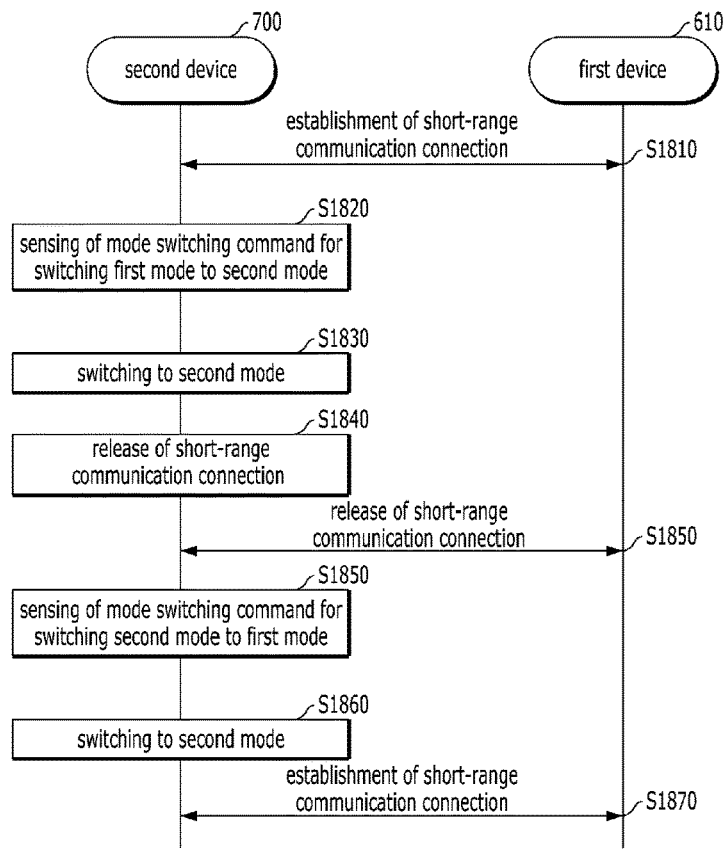
[Fig. 19]
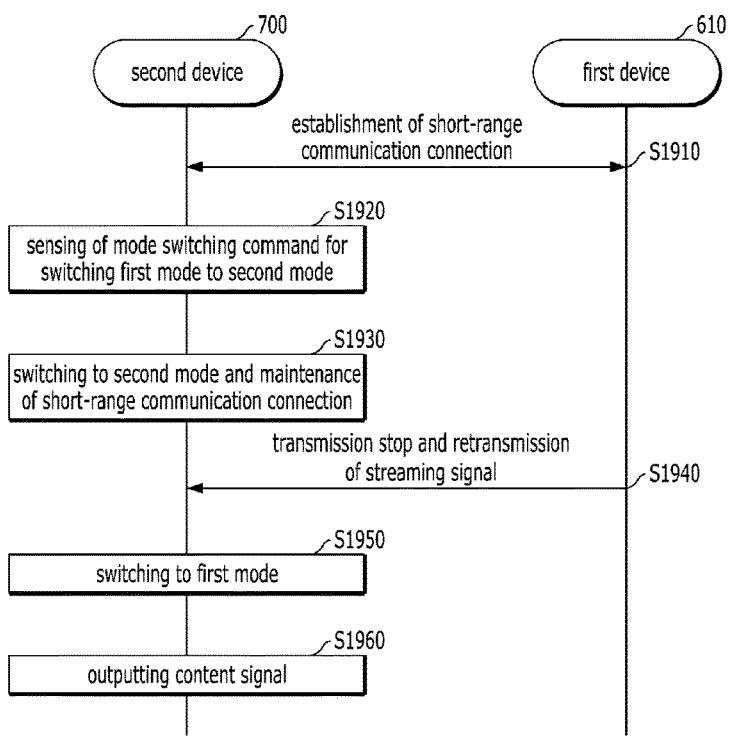

METHOD FOR AUTOMATICALLY CONNECTING A SHORT-RANGE COMMUNICATION BETWEEN TWO DEVICES AND APPARATUS FOR THE SAME

CROSS REFERENCE TO RELATED APPLICATIONS

This application is the National Phase of PCT International Application No. PCT/KR2015/001387, filed on Feb. 11, 2015, which claims priority under 35 U.S.C. 119(a) to Patent Application No. 10-2015-0008014, filed in the Republic of Korea on Jan. 16, 2015, all of which are hereby expressly incorporated by reference into the present application.

TECHNICAL FIELD

The present invention relates to a method for automatically connecting a short-range communication between two devices and an apparatus for the same, and more particularly, to a method for enabling any one device, which is in a sleep mode, to automatically connect a short-range communication with another device by releasing the sleep mode in accordance with a predetermined condition.

BACKGROUND ART

Recently, users who listen to audio of music files or moving picture files by using an output device such as an earphone or speaker have been increased, wherein the output device such as the earphone or speaker is connected with a multimedia device, which may store or receive the music files or moving picture files, through Bluetooth wireless communication. However, when a user intends to connect Bluetooth wireless communication between the multimedia device and the output device, since the user cannot perform wireless communication connection if the output device is power-off, there is inconvenience in that the user should separately switch the power of the output device to a power-on state.

Accordingly, if the user intends to connect Bluetooth wireless communication between the multimedia device and the output device, a solution for automatically connecting the multimedia device with the output device through wireless communication in accordance with intention of the user even if the output device is powered-off will be required.

DISCLOSURE OF INVENTION

Technical Problem

An object of the present invention is to solve the aforementioned problem and other problems. Also, another object of the present invention is to provide a method for automatically connecting two devices with each other through short-range communication when one of the devices, which is a target for short-range communication connection, is in a sleep mode, and an apparatus for the same.

Other object of the present invention is to provide a method for automatically releasing short-range communication connection between two devices if short-range communication is automatically connected between the two devices, or automatically reconnecting short-range communication between the two devices after the short-range communication connection is released, and an apparatus for the same.

Additional advantages, objects, and features of the specification will be set forth in part in the description which follows and in part will become apparent to those having ordinary skill in the art upon examination of the following or may be learned from practice of the specification. The objectives and other advantages of the specification may be realized and attained by the structure particularly pointed out in the written description and claims hereof as well as the appended drawings.

Solution to Problem

According to one embodiment of the present invention, an apparatus comprises a short-range communication module configured to enable short-range communication with an external device; an interrupt detector configured to sense an interrupt signal for short-range communication connection, which is received from the external device through the short-range communication module in a sleep mode where a standby power is supplied; and a controller, the interrupt detector wakes up the controller if the interrupt signal is sensed in the sleep mode, and the woken-up controller releases the sleep mode and controls the short-range communication module to perform short-range communication connection with the external device.

According to another embodiment of the present invention, a method for automatically connecting short-range communication between two devices comprises transmitting an interrupt signal for short-range communication connection from a first device to a second device; sensing the interrupt signal for short-range communication connection, which is transmitted from the first device, in a sleep mode of the second device where a standby power is supplied; waking up a controller of the second device if the interrupt signal is sensed in the sleep mode; releasing the sleep mode in the second device; and transmitting a first signal for accepting a short-range communication connection, from the second device to the first device.

Advantageous Effects of Invention

Advantageous effects of the method for automatically connecting short-range communication between two devices in accordance with the present invention will be described as follows.

According to one embodiment of the present invention, a method for automatically connecting short-range communication between two devices with each other when one of the devices, which is a target for short-range communication connection, is in a sleep mode, and an apparatus for the same may be provided.

Also, according to one embodiment of the present invention, a method for automatically releasing short-range communication connection between two devices if short-range communication is automatically connected between the two devices, or automatically re-connecting short-range communication between the two devices after the short-range communication connection is released, and an apparatus for the same may be provided.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF DRAWINGS

FIG. 1 is a diagram briefly illustrating a service system that includes a display device according to one embodiment of the present invention;

FIG. 2 is a schematic block diagram illustrating a display device according to one embodiment of the present invention;

FIG. 3 is a schematic block diagram illustrating a detailed configuration of a controller of FIG. 2 in accordance with one embodiment of the present invention;

FIG. 4 is a diagram illustrating an input means connected with a display device of FIG. 2 according to one embodiment of the present invention;

FIG. 5 is a block diagram illustrating an example of a mobile terminal related to the present invention;

FIG. 6 is a diagram illustrating an example of a method for automatically connecting short-range communication between two devices in accordance with one embodiment of the present invention;

FIGS. 7a and 7b are block diagrams illustrating an example of configuration modules of a second device according to one embodiment of the present invention;

FIG. 8 is a flow chart illustrating an example of a method for automatically connecting short-range communication between two devices in accordance with one embodiment of the present invention;

FIG. 9 is a diagram illustrating an example of an interrupt signal transmitted to a receiving side of a short-range communication module in a sleep mode of a second device in accordance with one embodiment of the present invention;

FIG. 10 is a diagram illustrating an example of a method for automatically connecting short-range communication between a first device and a second device when a specific event occurs in the first device in accordance with one embodiment of the present invention;

FIG. 11 is a diagram illustrating another example of a method for automatically connecting short-range communication between a first device and a second device when a specific event occurs in the first device in accordance with one embodiment of the present invention;

FIG. 12 is a diagram illustrating an example of a guide message output to a display unit in a second device according to one embodiment of the present invention;

FIG. 13 is a diagram illustrating still another example of a method for automatically connecting short-range communication between a first device and a second device when a specific event occurs in the first device in accordance with one embodiment of the present invention;

FIG. 14 is a diagram illustrating further still another example of a method for automatically connecting short-range communication between a first device and a second device when a specific event occurs in the first device in accordance with one embodiment of the present invention;

FIG. 15 is a diagram illustrating further still another example of a method for automatically connecting short-range communication between a first device and a second device when a specific event occurs in the first device in accordance with one embodiment of the present invention;

FIG. 16 is a diagram illustrating an example of a guide message, which may be output to a display unit when a specific event occurs in a first device according to one embodiment of the present invention;

FIG. 17 is a flow chart illustrating an example of a method for releasing short-range communication when the short-range communication is automatically connected between a first device and a second device in accordance with one embodiment of the present invention;

FIG. 18 is a flow chart illustrating another example of a method for releasing short-range communication when the short-range communication is automatically connected between a first device and a second device in accordance with one embodiment of the present invention; and FIG. 19 is a flow chart illustrating an example of a method for maintaining short-range communication when the short-range communication is automatically connected between a first device and a second device in accordance with one embodiment of the present invention.

BEST MODE FOR CARRYING OUT THE INVENTION

Description will now be given in detail according to embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

FIG. 1 illustrates a broadcast system including a display device according to an embodiment of the present invention. Referring to FIG. 1, examples of a broadcast system comprising a display device may include a content provider (CP) 10, a service provider (SP) 20, a network provider (NP) 30, and a home network end user (HNED) (Customer) 40. The HNED 40 includes a client 100, that is, a display device.

Each of the CP 10, SP 20 and NP 30, or a combination thereof may be referred to as a server. The HNED 40 can also function as a server. The term 'server' means an entity that transmits data to another entity in a digital broadcast environment. Considering a server-client concept, the server can be regarded as an absolute concept and a relative concept. For example, one entity can be a server in a relationship with a first entity and can be a client in a relationship with a second entity.

The CP 10 is an entity that produces content. Referring to FIG. 1, the CP 10 can include a first or second terrestrial broadcaster, a cable system operator (SO), a multiple system operator (MSO), a satellite broadcaster, various Internet broadcasters, private content providers (CPs), etc. The content can include applications as well as broadcast content.

The SP 20 packetizes content provided by the CP 10. Referring to FIG. 1, the SP 20 packetizes content provided by the CP 10 into one or more services available for users. The SP 20 can provide services to the client 100 in a uni-cast or multi-cast manner. The CP 10 and the SP 20 can be configured in the form of one entity. For example, the CP 10 can function as the SP 20 by producing content and directly packetizing the produced content into services, and vice versa.

The NP 30 can provide a network environment for data exchange between the server 10 and/or 20 and the client 100.

The NP 30 supports wired/wireless communication protocols and constructs environments therefor. In addition, the NP 30 can provide a cloud environment. The client 100 can construct a home network and transmit/receive data.

The server can use and request a content protection means such as conditional access. The client 100 can use a means such as a cable card or downloadable CAS (DCAS), which corresponds to the content protection means of the server. In addition, the client 100 can use an interactive service through a network. The client 100 can directly serve as the CP 10 and/or the SP 20 in a relationship with another client or indirectly function as a server of the other client.

FIG. 2 illustrates a display device according to another embodiment of the present invention.

Referring to FIG. 2, a display device 200 according to an embodiment of the present invention may include a broadcast receiving unit 205, an external device interface 235, a storage unit 240, a user input interface 250, a controller 270, a display unit 280, an audio output unit 285, a power supply unit 290, and a photographing unit. The broadcast receiving unit 205 may include at least one of one or more tuner 210, a demodulator 220, and a network interface 230. The broadcast receiving unit 205 may include the tuner 210 and the demodulator 220 without the network interface 230, or may include the network interface 230 without the tuner 210 and the demodulator 220. The broadcast receiving unit 205 may include a multiplexer to multiplex a signal, which is subjected to the tuner 210 and demodulated by the demodulator 220, and a signal received through the network interface 230. In addition, the broadcast receiving unit 205 can include a demultiplexer and demultiplex a multiplexed signal, a demodulated signal, or a signal received through the network interface 230.

The tuner 210 may receive a radio frequency (RF) broadcast signal by tuning to a channel selected by the user from among RF broadcast signals received through an antenna or all previously stored channels. The demodulator 220 may receive a digital IF (Intermediate Frequency) signal (DIF) converted by the tuner 210 and demodulate the DIF signal. A stream signal output from the demodulator 220 may be input to the controller 270. The controller 270 can control demultiplexing, audio/video signal processing, etc. Furthermore, the controller 270 can control output of an image through the display unit 280 and output of audio through the audio output unit 85.

The external device interface 235 may provide an environment for interfacing external devices with the display device 200. To implement this, the external device interface 235 may include an A/V input/output unit or an RF communication unit. The external device interface 235 can be connected with external devices such as a digital versatile disk (DVD), a Blu-ray player, a game device, a camera, a camcorder, a computer (notebook computer), a Cloud and a mobile device (e.g., a Smart Phone, a tablet PC, and the like) in a wired/wireless manner.

The A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The RF communication unit can perform near field communication. The display device 200 can be networked with other electronic apparatuses according to communication protocols such as Bluetooth, radio frequency identification (RFID), infrared data association (IrDA), ultra wideband (UWB), ZigBee, and digital living network alliance (DLNA), for example.

The network interface 230 may provide an interface for connecting the display device 200 to wired/wireless networks. Using the network interface 230, the display device can transmit/receive data to/from other users or other electronic apparatuses or access a predetermined web page through a network connected thereto or another network linked to the connected network.

The network interface 230 can selectively receive a desired application from among publicly open applications through a network. The storage unit 240 may store programs for signal processing and control and store a processed video, audio or data signal. In addition, the storage unit 240 may execute a function of temporarily storing a video, audio or data signal input from the external device interface 235 or the network interface 230. The storage unit 240 may store information about a predetermined broadcast channel through a channel memory function.

The storage unit 240 can store an application or a list of applications input from the external device interface 235 or the network interface 230. The storage unit 240 may store various platforms which will be described later. The storage unit 240 can include storage media of one or more types, such as a flash memory type, a hard disk type, a multimedia card micro type, a card type memory (e.g. SD or XD memory), RAM, EEPROM, etc. The display device 200 may reproduce content files (a video file, a still image file, a music file, a text file, an application file, etc.) and provide them to the user.

While FIG. 2 illustrates an embodiment in which the storage unit 240 is separated from the controller 270, the configuration of the display device 200 is not limited thereto and the storage unit 240 may be included in the controller 270. The user input interface 250 may transmit a signal input by the user to the controller 270 or deliver a signal output from the controller 270 to the user.

For example, the user input interface 250 can receive control signals such as a power on/off signal, a channel selection signal, an image setting signal, etc. from the remote controller 400 or transmit control signals of the controller 270 to the remote controller 400 according to various communication schemes such as RF communication, IR communication, and the like.

The user input interface 250 can transmit control signals input through a power key, a channel key, a volume key, and a local key of a set value to the controller 270. The user input interface 250 can transmit a control signal input from a sensing unit which senses a gesture of the user or deliver a signal of the controller 270 to the sensing unit. Here, the sensing unit may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 270 can generate and output a signal for video or audio output by demultiplexing streams input through the tuner 210, the demodulator 220 or the external device interface 235 or processing demultiplexed signals. A video signal processed by the controller 270 can be input to the display unit 280 and displayed as an image through the display unit 280. In addition, the video signal processed by the controller 270 can be input to an external output device through the external device interface 235.

An audio signal processed by the controller 270 can be applied to the audio output unit 285. Otherwise, the audio signal processed by the controller 270 can be applied to an external output device through the external device interface 235. The controller 270 may include a demultiplexer and an image processor, which are not shown in FIG. 2.

The controller 470 can control the overall operation of the display device 200. For example, the controller 270 can control the tuner 210 to tune to an RF broadcast corresponding to a channel selected by the user or a previously stored channel. The controller 270 can control the display device 200 according to a user command input through the user input interface 250 or an internal program. Particularly, the controller 270 can control the display device 200 to be linked to a network to download an application or application list that the user desires to the display device 200.

For example, the controller 270 may control the tuner 210 to receive a signal of a channel selected in response to a predetermined channel selection command received through the user input interface 250. In addition, the controller 270 may process a video, audio or data signal corresponding to the selected channel. The controller 270 may control information on a channel selected by the user to be output with a processed video or audio signal through the display unit 280 or the audio output unit 285.

Alternatively, the controller 270 may control a video signal or an audio signal received from an external apparatus, for example, a camera or a camcorder through the external device interface 235 to be output through the display unit 280 or the audio output unit 285 according to an external device image reproduction command received through the user input interface 250.

The controller 270 can control the display unit 280 to display images. For example, the controller 270 can control a broadcast image input through the tuner 210, an external input image received through the external device interface 235, an image input through the network interface 230, or an image stored in the storage unit 240 to be displayed on the display unit 280. Here, an image displayed on the display unit 280 can be a still image or video, and it can be a 2D or 3D image.

The controller 270 can control reproduction of content. Here, the content may be content stored in the display device 200, received broadcast content, or content input from an external device. The content may include at least one of a broadcast image, an external input image, an audio file, a still image, an image of a linked web, and a text file.

The controller 270 can control display of applications or an application list, downloadable from the display device 200 or an external network, when an application view menu is selected. The controller 270 can control installation and execution of applications downloaded from an external network in addition to various user interfaces. Furthermore, the controller 270 can control an image relating to an application executed by user selection to be displayed on the display unit 280.

The display device 200 may further include a channel browsing processor which generates a thumbnail image corresponding to a channel signal or an external input signal. The channel browsing processor can receive a stream signal (e.g., TS) output from the demodulator 220 or a stream signal output from the external device interface 235 and extract an image from the received stream signal to generate a thumbnail image. The generated thumbnail image can be directly input to the controller 270 or can be encoded and then input to the controller 270. Also, the thumbnail image can be coded into a stream and then applied to the controller 270. The controller 270 can display a thumbnail list including a plurality of thumbnail images on the display unit 280 using thumbnail images input thereto. The thumbnail images included in the thumbnail list can be updated sequentially or simultaneously. Accordingly, the user can conveniently check content of a plurality of broadcast channels.

The display unit 280 may convert a video signal, a data signal, and an OSD signal processed by the controller 270 and a video signal and a data signal received from the external device interface 235 into RGB signals to generate driving signals. The display unit 280 may be a PDP, an LCD, an OLED, a flexible display, a 3D display or the like. The display unit 280 may be configured as a touch-screen and used as an input device rather than an output device. The audio output unit 285 receives a signal audio-processed by the controller 270, for example, a stereo signal, a 3.1 channel signal or a 5.1 channel signal, and outputs the received signal as audio. The audio output unit 285 can be configured as one of various speakers.

The display device 200 may further include the sensing unit for sensing a gesture of the user, which includes at least one of a touch sensor, a voice sensor, a position sensor, and an action sensor, as described above. A signal sensed by the sensing unit can be delivered to the controller 270 through the user input interface 250. The display device 200 may further include the photographing unit for photographing the user. Image information acquired by the photographing unit can be supplied to the controller 270. The controller 270 may sense a gesture of the user from an image captured by the photographing unit or a signal sensed by the sensing unit, or by combining the image and the signal.

The power supply unit 290 may supply power to the display device 200. Particularly, the power supply unit 290 can supply power to the controller 270 which can be implemented as a system-on-chip (SoC), the display unit 280 for displaying images, and the audio output unit 485 for audio output.

The remote controller 400 may transmit user input to the user input interface 250. To achieve this, the remote controller 400 can use Bluetooth, RF communication, IR communication, UWB, ZigBee, etc. In addition, the remote controller 400 can receive audio, video or data signal output from the user input interface 250 and display the received signal or output the same as audio or vibration.

Components of the display device 200 in FIG. 2 can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention. Some of the components shown in FIG. 2 may be omitted or a component (not shown in FIG. 2) may be added as required. The display device according to an embodiment of the present invention may not include the tuner and the demodulator, differently from the display device shown in FIG. 2, and may receive content through the network interface or the external device interface and reproduce the content.

The digital receiver is an example of image signal processors which process an image stored therein or an input image. Other examples of the image signal processors may include a set-top box (STB) which does not include the display unit 280 and the audio output unit 285 shown in FIG. 2, a DVD player, a Blu-ray player, a game device, a computer, etc.

FIG. 3 illustrates a display device according to another embodiment of the present invention. Particularly, FIG. 3 shows a configuration for implementing a 3D display device, which can be included in the configurations of FIG. 2. The display device (especially, the controller 270) according to an embodiment of the present invention may include a demultiplexer 310, an image processor 320, an OSD generator 340, a mixer 350, a frame rate converter (FRC) 355, and a 3D formatter (or an Output formatter) 360.

The demultiplexer 310 can demultiplex an input stream signal into an MPEG-2 TS image, an audio signal and a data signal, for example. The image processor 320 can process a demultiplexed image signal using a video decoder 325 and a scaler 335. The video decoder 325 can decode the demultiplexed image signal and the scaler 335 can scale the resolution of the decoded image signal such that the image signal can be displayed.

The image signal decoded by the image processor 320 may be input to the mixer 350.

The OSD generator 340 may generate OSD data automatically or according to user input. For example, the OSD generator 540 may generate data to be displayed on the screen of an output unit in the form of an image or text based on a control signal of a user input interface. OSD data generated by the OSD generator 540 may include various data such as a user interface image of the display device, various menu screens, widget, icons, and information on ratings. The OSD generator 340 can generate a caption of a broadcast image or data for displaying EPG based broadcast information.

The mixer 350 may mix the OSD data generated by the OSD generator 340 and the image signal processed by the image processor 320. The mixer 350 may provide the mixed signal to the 3D formatter 360. By mixing the decoded image signal and the OSD data, OSD may be overlaid on a broadcast image or external input image.

The frame rate converter (FRC) 355 may convert a frame rate of input video. For example, the frame rate converter 355 can convert the frame rate of an input 60 Hz video to a frame rate of 120 Hz or 240 Hz, according to an output frequency of the output unit. The frame rate converter 355 may be bypassed when frame conversion is not executed.

The 3D formatter 360 may change the output of the frame rate converter 355, which is input thereto, into a form suitable for the output format of the output unit. For example, the 3D formatter 360 can output an RGB data signal. In this instance, this RGB data signal can be output according to low voltage differential signaling (LVDS) or mini-LVDS. When a 3D image signal output from the frame rate converter 355 is input to the 3D formatter 360, the 3D formatter 360 can format the 3D image signal such that the 3D image signal is matched to the output format of the output unit, to thereby support a 3D service.

An audio processor may audio-process a demultiplexed audio signal. The audio processor can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor can include decoders corresponding to the formats to process the audio signals. Furthermore, the audio processor can control base, treble and volume.

In addition, a data processor can process a demultiplexed data signal. For example, when a demultiplexed data signal is encoded, the data processor can decode the encoded demultiplexed data signal. Here, the encoded data signal may be EPG information including broadcast information such as the start time and end time (or duration) of a broadcast program which is broadcast through each channel.

FIG. 4 illustrates remote controllers of a display device according to an embodiment of the present invention. To execute various operations for implementing the present invention according to embodiments, various user interface devices (UIDs) which can communicate with a display device 200 in a wired/wireless manner can be used as remote controllers.

The remote controllers can use various communication protocols such as Bluetooth, RFID, IrDA, UWB, ZigBee, DLNA, etc. UIDs can include a mobile device (e.g., a smart phone, a tablet PC, and the like), a magic remote controller 420 and a remote controller 430 equipped with a keyboard and a touch pad in addition to a general remote controller 410.

The magic remote controller 420 may include a gyro sensor mounted therein to sense vibration of a user's hand or rotation. That is, the magic remote controller 420 can move a pointer according to up, down, left and right motions of the user such that the user can easily execute a desired action, for example, easily control a channel or a menu.

The remote controller 430 including the keyboard and touch pad can facilitate text input through the keyboard and control of movement of a pointer and magnification and reduction of a picture or video through the touch pad.

FIG. 5 is a block diagram of a mobile terminal in accordance with the present disclosure.

The mobile terminal 500 is shown having components such as a wireless communication unit 510, an input unit 520, a sensing unit 540, an output unit 550, an interface unit 560, a memory 570, a controller 580, and a power supply unit 590. It is understood that implementing all of the illustrated components is not a requirement, and that greater or fewer components may alternatively be implemented.

Referring now to FIG. 5, the mobile terminal 500 is shown having wireless communication unit 510 configured with several commonly implemented components. For instance, the wireless communication unit 510 typically includes one or more components which permit wireless communication between the mobile terminal 500 and a wireless communication system or network within which the mobile terminal is located.

The wireless communication unit 510 typically includes one or more modules which permit communications such as wireless communications between the mobile terminal 500 and a wireless communication system, communications between the mobile terminal 500 and another mobile terminal, communications between the mobile terminal 500 and an external server. Further, the wireless communication unit 510 typically includes one or more modules which connect the mobile terminal 500 to one or more networks. To facilitate such communications, the wireless communication unit 510 includes one or more of a broadcast receiving module 511, a mobile communication module 512, a wireless Internet module 513, a short-range communication module 514, and a location information module 515.

The input unit 520 includes a camera 521 for obtaining images or video, a microphone 522, which is one type of audio input device for inputting an audio signal, and a user input unit 523 (for example, a touch key, a push key, a mechanical key, a soft key, and the like) for allowing a user to input information. Data (for example, audio, video, image, and the like) is obtained by the input unit 520 and may be analyzed and processed by controller 580 according to device parameters, user commands, and combinations thereof.

The sensing unit 540 is typically implemented using one or more sensors configured to sense internal information of the mobile terminal, the surrounding environment of the mobile terminal, user information, and the like. For example, in FIG. 5, the sensing unit 540 is shown having a proximity sensor 541 and an illumination sensor 542.

If desired, the sensing unit 540 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 521), a microphone 522, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 500 may be configured to utilize information obtained from sensing unit 540, and in particular, information obtained from one or more sensors of the sensing unit 540, and combinations thereof.

The output unit 550 is typically configured to output various types of information, such as audio, video, tactile output, and the like. The output unit 550 is shown having a display unit 551, an audio output module 552, a haptic module 553, and an optical output module 554.

The display unit 551 may have an inter-layered structure or an integrated structure with a touch sensor in order to facilitate a touch screen. The touch screen may provide an output interface between the mobile terminal 500 and a user, as well as function as the user input unit 523 which provides an input interface between the mobile terminal 500 and the user.

The interface unit 560 serves as an interface with various types of external devices that can be coupled to the mobile terminal 500. The interface unit 560, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 500 may perform assorted control functions associated with a connected external device, in response to the external device being connected to the interface unit 560.

The memory 570 is typically implemented to store data to support various functions or features of the mobile terminal 500. For instance, the memory 570 may be configured to store application programs executed in the mobile terminal 500, data or instructions for operations of the mobile terminal 500, and the like. Some of these application programs may be downloaded from an external server via wireless communication. Other application programs may be installed within the mobile terminal 500 at time of manufacturing or shipping, which is typically the case for basic functions of the mobile terminal 500 (for example, receiving a call, placing a call, receiving a message, sending a message, and the like). It is common for application programs to be stored in the memory 570, installed in the mobile terminal 500, and executed by the controller 580 to perform an operation (or function) for the mobile terminal 500.

The controller 580 typically functions to control overall operation of the mobile terminal 500, in addition to the operations associated with the application programs. The controller 580 may provide or process information or functions appropriate for a user by processing signals, data, information and the like, which are input or output by the various components depicted in FIG. 5, or activating application programs stored in the memory 570. As one example, the controller 580 controls some or all of the components illustrated in FIG. 5 according to the execution of an application program that have been stored in the memory 570.

The power supply unit 590 can be configured to receive external power or provide internal power in order to supply appropriate power required for operating elements and components included in the mobile terminal 500. The power supply unit 590 may include a battery, and the battery may be configured to be embedded in the terminal body, or configured to be detachable from the terminal body.

Referring still to FIG. 5, various components depicted in this figure will now be described in more detail. Regarding the wireless communication unit 510, the broadcast receiving module 511 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 511 may be utilized to facilitate simultaneously receiving of two or more broadcast channels, or to support switching among broadcast channels.

System which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 512.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 511 may be stored in a suitable device, such as a memory 570.

The mobile communication module 512 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000(Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 512 include audio call signals, video (telephony) call signals, or various formats of data to support communication of text and multimedia messages.

The wireless Internet module 513 is configured to facilitate wireless Internet access. This module may be internally or externally coupled to the mobile terminal 500. The wireless Internet module 513 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 513 performs such wireless Internet access. As such, the Internet module 513 may cooperate with, or function as, the mobile communication module 512.

The short-range communication module 514 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 514 in general supports wireless communications between the mobile terminal 500 and a wireless communication system, communications between the mobile terminal 500 and another mobile terminal 500, or communications between the mobile terminal and a network where another mobile terminal 500 (or an external server) is located, via wireless area networks. One example of the wireless area networks is a wireless personal area networks.

In some embodiments, another mobile terminal (which may be configured similarly to mobile terminal 500) may be a wearable device, for example, a smart watch, a smart glass or a head mounted display (HMD), which is able to exchange data with the mobile terminal 500 (or otherwise cooperate with the mobile terminal 500). The short-range communication module 514 may sense or recognize the wearable device, and permit communication between the wearable device and the mobile terminal 500. In addition, when the sensed wearable device is a device which is authenticated to communicate with the mobile terminal 500, the controller 580, for example, may cause transmission of data processed in the mobile terminal 500 to the wearable device via the short-range communication module 514. Hence, a user of the wearable device may use the data processed in the mobile terminal 500 on the wearable device. For example, when a call is received in the mobile terminal 500, the user may answer the call using the wearable device. Also, when a message is received in the mobile terminal 500, the user can check the received message using the wearable device.

The location information module 515 is generally configured to detect, calculate, derive or otherwise identify a position of the mobile terminal. As an example, the location information module 515 includes a Global Position System (GPS) module, a Wi-Fi module, or both. If desired, the location information module 515 may alternatively or additionally function with any of the other modules of the wireless communication unit 510 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 520 may be configured to permit various types of input to the mobile terminal 520. Examples of such input include audio, image, video, data, and user input. Image and video input is often obtained using one or more cameras 521. Such cameras 521 may process image frames of still pictures or video obtained by image sensors in a video or image capture mode. The processed image frames can be displayed on the display unit 551 or stored in memory 570. In some cases, the cameras 521 may be arranged in a matrix configuration to permit a plurality of images having various angles or focal points to be input to the mobile terminal 500. As another example, the cameras 521 may be located in a stereoscopic arrangement to acquire left and right images for implementing a stereoscopic image.

The microphone 522 is generally implemented to permit audio input to the mobile terminal 500. The audio input can be processed in various manners according to a function being executed in the mobile terminal 500. If desired, the microphone 522 may include assorted noise removing algorithms to remove unwanted noise generated in the course of receiving the external audio.

The user input unit 523 is a component that permits input by a user. Such user input may enable the controller 580 to control operation of the mobile terminal 500. The user input unit 523 may include one or more of a mechanical input element (for example, a key, a button located on a front and/or rear surface or a side surface of the mobile terminal 500, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 540 is generally configured to sense one or more of internal information of the mobile terminal, surrounding environment information of the mobile terminal, user information, or the like. The controller 580 generally cooperates with the sending unit 540 to control operation of the mobile terminal 500 or execute data processing, a function or an operation associated with an application program installed in the mobile terminal based on the sensing provided by the sensing unit 540. The sensing unit 540 may be implemented using any of a variety of sensors, some of which will now be described in more detail.

The proximity sensor 541 may include a sensor to sense presence or absence of an object approaching a surface, or an object located near a surface, by using an electromagnetic field, infrared rays, or the like without a mechanical contact. The proximity sensor 541 may be arranged at an inner region of the mobile terminal covered by the touch screen, or near the touch screen.

The proximity sensor 541, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 541 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 541 may sense proximity touch, and proximity touch patterns (for example, distance, direction, speed, time, position, moving status, and the like).

In general, controller 580 processes data corresponding to proximity touches and proximity touch patterns sensed by the proximity sensor 541, and cause output of visual information on the touch screen. In addition, the controller 580 can control the mobile terminal 500 to execute different operations or process different data according to whether a touch with respect to a point on the touch screen is either a proximity touch or a contact touch.

A touch sensor can sense a touch applied to the touch screen, such as display unit 551, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 551, or convert capacitance occurring at a specific part of the display unit 551, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 580. Accordingly, the controller 580 may sense which region of the display unit 551 has been touched. Here, the touch controller may be a component separate from the controller 580, the controller 580, and combinations thereof.

In some embodiments, the controller 580 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 580, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 521 typically includes at least one a camera sensor (CCD, CMOS etc.), a photo sensor (or image sensors), and a laser sensor.

Implementing the camera 521 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 551 is generally configured to output information processed in the mobile terminal 500. For example, the display unit 551 may display execution screen information of an application program executing at the mobile terminal 500 or user interface (UI) and graphic user interface (GUI) information in response to the execution screen information.

In some embodiments, the display unit 551 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 552 is generally configured to output audio data. Such audio data may be obtained from any of a number of different sources, such that the audio data may be received from the wireless communication unit 510 or may have been stored in the memory 570. The audio data may be output during modes such as a signal reception mode, a call mode, a record mode, a voice recognition mode, a broadcast reception mode, and the like. The audio output module 552 can provide audible output related to a particular function (e.g., a call signal reception sound, a message reception sound, etc.) performed by the mobile terminal 500. The audio output module 152 may also be implemented as a receiver, a speaker, a buzzer, or the like.

A haptic module 553 can be configured to generate various tactile effects that a user feels, perceive, or otherwise experience. A typical example of a tactile effect generated by the haptic module 553 is vibration. The strength, pattern and the like of the vibration generated by the haptic module 553 can be controlled by user selection or setting by the controller. For example, the haptic module 553 may output different vibrations in a combining manner or a sequential manner.

Besides vibration, the haptic module 553 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 553 can also be implemented to allow the user to feel a tactile effect through a muscle sensation such as the user's fingers or arm, as well as transferring the tactile effect through direct contact. Two or more haptic modules 553 may be provided according to the particular configuration of the mobile terminal 500.

An optical output module 554 can output a signal for indicating an event generation using light of a light source. Examples of events generated in the mobile terminal 500 may include message reception, call signal reception, a missed call, an alarm, a schedule notice, an email reception, information reception through an application, and the like.

A signal output by the optical output module 554 may be implemented in such a manner that the mobile terminal emits monochromatic light or light with a plurality of colors.

The signal output may be terminated as the mobile terminal senses that a user has checked the generated event, for example.

The interface unit 560 serves as an interface for external devices to be connected with the mobile terminal 500. For example, the interface unit 160 can receive data transmitted from an external device, receive power to transfer to elements and components within the mobile terminal 500, or transmit internal data of the mobile terminal 500 to such external device. The interface unit 560 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 500 via the interface unit 560.

When the mobile terminal 500 is connected with an external cradle, the interface unit 560 can serve as a passage to allow power from the cradle to be supplied to the mobile terminal 500 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 570 can store programs to support operations of the controller 580 and store input/output data (for example, phonebook, messages, still images, videos, etc.). The memory 570 may store data related to various patterns of vibrations and audio which are output in response to touch inputs on the touch screen.

The memory 570 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 500 may also be operated in relation to a network storage device that performs the storage function of the memory 570 over a network, such as the Internet.

The controller 580 may typically control the general operations of the mobile terminal 500. For example, the controller 580 may set or release a lock state for restricting a user from inputting a control command with respect to applications when a status of the mobile terminal meets a preset condition.

The controller 580 can also perform the controlling and processing associated with voice calls, data communications, video calls, and the like, or perform pattern recognition processing to recognize a handwriting input or a picture drawing input performed on the touch screen as characters or images, respectively. In addition, the controller 580 can control one or a combination of those components in order to implement various exemplary embodiments disclosed herein.

The power supply unit 590 receives external power or provide internal power and supply the appropriate power required for operating respective elements and components included in the mobile terminal 500. The power supply unit 590 may include a battery, which is typically rechargeable or be detachably coupled to the terminal body for charging.

The power supply unit 590 may include a connection port. The connection port may be configured as one example of the interface unit 560 to which an external charger for supplying power to recharge the battery is electrically connected.

As another example, the power supply unit 590 may be configured to recharge the battery in a wireless manner without use of the connection port. In this example, the power supply unit 590 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Hereinafter, a method for automatically connecting short-range communication between two devices in accordance with one embodiment of the present invention and an apparatus for the same will be described with reference to FIGS. 6 to 19.

In this specification, short-range communication may refer to wireless communication performed using at least one of Bluetooth™, Radio Frequency Identification (RFID), infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB).

Also, in this specification, for convenience of description, a device that first tries short-range communication connection will be referred to as a first device, and a device that receives a signal for short-range communication connection from the first device will be referred to as a second device. In accordance with the embodiment, the first device may be a type of the mobile terminal 500 described with reference to FIG. 5. Meanwhile, the second device may be a type of the display device described with reference to FIGS. 1 and 2 or a type of the mobile terminal 500 described with reference to FIG. 5, or may be an electronic device such as a set-top box (STB), a sound bar, an audio, a speaker, a Bluetooth, ear phone, a blue-ray disc (BD) player, a refrigerator, and an air conditioner.

FIG. 6 is a diagram illustrating an example of a method for automatically connecting short-range communication between two devices in accordance with one embodiment of the present invention.

In this embodiment, it is assumed that the first device 610, which first tries short-range communication connection, is a type of the aforementioned mobile terminal 500, and the second device 700, which receives a signal for short-range communication connection from the first device 610, is a type of a sound bar. In this specification, the signal for short-range communication connection will be referred to as an interrupt signal.

The second device 700 is in a state of a sleep mode before short-communication connection with the first device 610. The sleep mode refers to a low power mode that a standby power is supplied to the second device 700, and may mean the state that a minimum power is supplied to a module, which is required to sense the interrupt signal received from an external device (for example, the first device 610), among configuration modules of the second device 700.

The first device 610 may transmit the interrupt signal for short-range communication connection to the second device 700 when a specific event occurs. In accordance with the embodiment, the first device 610 may transmit the interrupt signal for short-range communication connection during occurrence of the specific event to the second device 700 only in a state that an automatic connection function of short-range communication is enabled. Occurrence of the specific event will be described in more detail with reference to FIGS. 8 to 16.

The second device 700 may sense the interrupt signal for short-range communication connection, which is transmitted from the first device 610, in a sleep mode, release the sleep mode if the interrupt signal is sensed, and transmit a signal for accepting short-range communication connection to the first device 610. As a result, short-range communication connection may be established between the first device 610 and the second device 700.

According to this embodiment, if the second device 700 is in a state of the sleep mode, short-range communication may be connected automatically between the first device 610 and the second device 700 to adapt to intention of the user even though the user does not take any separate action such as turning-on of the second device 700, whereby user convenience may be improved.

FIGS. 7a and 7b are block diagrams illustrating an example of configuration modules of a second device according to one embodiment of the present invention.

First of all, referring to FIG. 7a, the second device 700 according to one embodiment of the present invention may include an audio output module 710, a first memory 720, a second memory 730, an interface unit 740, a display unit 750, and a short-range communication module 760.

In accordance with the embodiment, the second device 700 may include modules more than or smaller than the aforementioned modules, and two or more modules shown in FIG. 7a may be implemented as one module and one module shown in FIG. 7a may be implemented as two or more modules. Also, in accordance with the embodiment, at least a part of the first memory 720 and the second memory 730 may be implemented within a controller 770, or at least a part of the controller 770 may be implemented within the second memory 730. Also, in accordance with the embodiment, if at least a part of the first memory 720 and the second memory 730 is operated only under the control of the controller 770 without being operated as it is, at least a part of the first memory 720 and the second memory 730 may be referred to as the controller 770.

The audio output module 710 may output an audio signal received from the external device and an audio signal stored in an internal memory of the second device 700, under the control of the controller 770. If short-range communication is connected automatically between the second device 700 and the first device 610 in accordance with one embodiment of the present invention, the audio output module 710 may output the audio signal received from the first device 610 through the short-range communication module 760.

The display unit 750 displays (outputs) the state of the second device 700 and information processed by the second device 700. For example, the display unit 750 may display information on an execution screen of a program driven by the second device 700 or information user interface (UI) information and graphic user interface (GUI) information, which are based on the information on the execution screen. In accordance with the embodiment, the display unit 750 may include a touch sensor.

The short-range communication module 760 is intended for short-range communication, and may support short-range communication by using at least one of Bluetooth™, Radio Frequency Identification (RFID), infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB). The short-range communication module 760 may support wireless communication between the second device 700 and the external device (for example, the first device 610) or between the second device 700 and a network where the external device is located, through a short-range wireless area network. In accordance with one embodiment of the present invention, the controller 770 may control the short-range communication module 760 to connect short communication with the first external device 610 which has a history of short-range communication with the second device 700 when a specific event occurs.

The interface unit 740 serves as a passage with all the external devices connected to the second device 700. The interface unit 740 receives data from the external device, is supplied with the power from the external device, forwards the data or the power to each element of the mobile terminal 100, or transmits data of the mobile terminal 100 to the external device. Also, the interface unit 740 may serve as a user input module that receives information from the user. The interface unit 740 may control the operation of the second device 700 to correspond to the information input by the user.

The controller 770 serves to control the operation of second device 700 and the operation of each configuration module.

The second memory 730 stores data, which support various functions of the second device 700, therein. The second memory 730 may store an operating system (OS) driven in the second device 700, an application program (or application), data for the operation of the second device 700, command languages, etc. The second memory 730 may include at least one type storage medium of a flash memory type, a hard disk type, a solid state disk (SSD) type, a silicon disk drive (SDD) type, a multimedia card micro type, a card-type memory (e.g., SD memory, XD memory, etc.), a random access memory (RAM), a static random access memory (SRAM), a synchronous dynamic random access memory (SDRAM), a read-only memory (ROM), an electrically erasable programmable read-only memory (EEPROM), a programmable read-only memory (PROM), a magnetic memory, a magnetic disk and an optical disk.

The controller 770 may copy program/data required for the operation of the second device 700, which are stored in the second memory 730, in the first memory 720 and then use the program/data. The first memory 720 may include at least one type storage medium of a random access memory (RAM), a static random access memory (SRAM), a synchronous dynamic random access memory (SDRAM), a read-only memory (ROM), an electrically erasable programmable read-only memory (EEPROM), and a programmable read-only memory (PROM).

The second memory 730 may include a first storage area 731, a second storage area 732, and a third storage area 733. However, in accordance with the embodiment, the second memory 730 may include storage areas less than or more than the first, second and third storage areas.

The first storage area 731 may store a start code, a boot loader, a kernel, etc., which are required to boot the second device 700. If the second device 700 is turned on, the start code, the boot loader, and the kernel, which are intended to operate the OS of the second device 700, may be copied in the first memory 720 and then executed after their compression is released.

The second storage area 732 may store a program, application, firmware, etc., which are driven by the second device 700. If booting of the second device 700 is completed, the controller 770 may use data required for the operation of the second device 700 by copying the data from the second storage area 732 in the first memory 720. At least a part of the second storage area 732 may be implemented as the controller 770, and may be referred to as the controller 770 for convenience of description.

The third storage area 733 may store data for power management control of the second device 700. At least a part of the third storage area 733 may continue to be supplied with the power even if the second device 700 is in the state of the sleep mode. In more detail, the third storage area 733 may include an SDRAM therein. The SDRAM may be operated in a self-refresh mode when the second device 700 is operated in the sleep mode. The third storage area 733 may be implemented as a type of MCU (Micro Controller Unit), EC (Embedded Controller), etc.

In accordance with the embodiment, when the second device 700 is in the state of the sleep mode, at least a part of the first storage area 731 of the second memory 730 and at least a part of the third storage area 733 may continue to be supplied with the power.

The third storage area 733 may include an interrupt detector 734. The interrupt detector 734 may sense the interrupt signal for short-range communication connection, which is received from the external device (for example, the first device 610) through the short-range communication module 760, when the second device 700 is in the state of the sleep mode. Accordingly, the interrupt detector 734 may maintain a wake-up state even though the second device 700 is in the state of the sleep mode.

The interrupt detector 734 wakes up the controller 770 if it senses the interrupt signal for short-range communication connection. The woken-up controller 770 may release the sleep mode by waking up the second storage area 732 within the second memory 732, and may control the short-range communication module 760 to perform short-range communication with the first device 610 if the sleep mode is released. In accordance with the embodiment, the interrupt detector 734 may wake up the controller 770 and the second storage area 732 within the second memory 732 if it senses the interrupt signal for short-range communication connection. Alternatively, in accordance with the embodiment, the interrupt detector 734 may wake up the second storage area 732 within the second memory 732 if it senses the interrupt signal for short-range communication connection, and the controller 770 may be woken up by the woken-up second storage area 732.

The interrupt detector 734 may sense the interrupt signal in the sleep mode only if the automatic connection function of the short-range communication is enabled by the second device 700. The user may select whether to use the automatic connection function of the short-range communication with the external device in a normal mode (for example, a normal use state not the sleep mode) of the second device 700. The controller 770 may store data (for example, flag) indicating that the automatic connection function of the short-range communication has been enabled, in the third storage area 733 if the automatic connection function of the short-range communication is selected.

In accordance with the embodiment, the interrupt detector 734 may wake up the controller 770 in the sleep mode only if the interrupt signal is sensed for a predetermined number of times or more within a preset time.

Meanwhile, in accordance with the embodiment, the interrupt detector 734 may be implemented as a separate module separately from the second memory 730 in the second device 700 as shown in FIG. 7b. For example, the interrupt detector 734 may be implemented as a hardware chip. In addition, since the interrupt detector 734 is similar to the description made with reference to FIG. 7a, its detailed description will be omitted.

FIG. 8 is a flow chart illustrating an example of a method for automatically connecting short-range communication between two devices in accordance with one embodiment of the present invention.

As described above, for convenience of description, it is assumed that the device, which first tries short-range communication connection, is referred to as the first device, and a device, which receives a signal for short-range communication connection from the first device, is referred to as the second device.

First of all, it is assumed that an automatic connection function of short-range communication of the second device 700 is enabled and the second device 700 is currently in a state of a sleep mode (S810). In the sleep mode, a minimum power may be supplied to a configuration module, which is required to sense the interrupt signal received from an external device (for example, the first device 610), among configuration modules of the second device 700.

A specific event occurs in the first device 610 (S820). The specific event refers to a predetermined event to transmit the signal for short-range communication connection to the second device 700. For example, examples of the specific event may include an event that a user input for connecting short-range communication with the second device 700 is sensed in the first device 610, an event that a user input for executing an application related to the short-range communication module is sensed in the first device 610, an event that detachment of an earphone is sensed in the first device 610, and an event that Bluetooth communication connection with a Bluetooth earphone is released in the first device 610.

If occurrence of the specific event is sensed, the first device 610 transmits a first signal for short-range communication connection to the second device 700 (S830).

The interrupt detector 734 of the second device 700 senses the first signal transmitted from the first device 610 (S840). The first signal may be the interrupt signal for short-range communication connection. The first signal may include device information of the first device 610. The interrupt detector 734 may sense the first signal transmitted to a receiving side of the short-range communication module 760.

The interrupt detector 734 may wake up the controller 770 if the first signal is sensed, and the controller 770 may release the sleep mode (S850). In accordance with the embodiment, the interrupt detector 734 may wake up the controller 770 only if the first signal is sensed as much as a predetermined number of times or more within a preset time. Alternatively, the interrupt detector 734 may wake up the controller 770 only if the first signal of predetermined strength or more is sensed as much as a predetermined number of times or more within a preset time.

FIG. 9 is a diagram illustrating an example of an interrupt signal transmitted to a receiving side of a short-range communication module in a sleep mode of a second device in accordance with one embodiment of the present invention.

If an interrupt signal corresponding to a voltage level more than a predetermined level is sensed in the receiving side of the short-range communication module 760 as much as a predetermined number of times or more within a preset time T, the interrupt detector 734 recognizes that the second device 700 which is in the state of the sleep mode needs automatic connection of short-range communication, and may wake up the controller 770.

Referring to FIG. 8 again, the controller 770 may control the short-range communication module 760 to transmit a second signal for accepting short-range communication connection with the first device 610 to the first device 610 (S860).

If the second signal is received by the first device 610, short-range communication connection between the first device 610 and the second device 700 may be established (S870).

The first device 610 may transmit a streaming signal and/or a control signal to the second device 700 through short-range communication (S880). The streaming signal may include at least one of an audio signal, a graphic signal, an image signal, a moving picture signal, and a video signal, and the control signal may include a signal for controlling the streaming signal in the second device 700.

The controller 770 of the second device 700 may output the streaming signal received from the first device 610 through the short-range communication module 760 and control a function related to the output streaming signal by using the received control signal (S890).

FIG. 10 is a diagram illustrating an example of a method for automatically connecting short-range communication between a first device and a second device when a specific event occurs in the first device in accordance with one embodiment of the present invention.

In this embodiment, it is assumed that the first device is a mobile terminal 500 described with reference to FIG. 5, and the second device is a sound bar 1000. The user may enable an automatic connection function of short-range communication among functions of the sound bar 1000. The automatic connection function of short-range communication refers to a function for automatically connecting short-range communication between the sound bar 1000 and the external device without any separate user action if the sound bar is in the state of the sleep mode, as described above. And, the sound bar 1000 is currently in the state of the sleep mode.

The controller 580 of the mobile terminal 500 may transmit the signal for short-range communication connection to the external device during occurrence of a specific event.

For example, the user may execute an environment setup menu of short-range communication in the mobile terminal 500. The controller 580 of the mobile terminal 500 outputs an execution screen 1010 of the executed environment setup menu of short-range communication to the display unit 541. A list of external devices having a history of short-range communication connection with the mobile terminal may be displayed on the execution screen 1010. The controller 580 senses a user command of the list of external devices displayed on the execution screen 1010, wherein the user command selects the sound bar 1000. If the user command for selecting the sound bar 1000 is sensed on the execution screen 1010, the controller 580 may consider that the specific event has occurred and control the wireless communication unit 510 to transmit the signal for short-range communication connection to the sound bar 1000.

The interrupt detector 734 of the sound bar 1000 senses the interrupt signal for short-range communication, which is transmitted from the mobile terminal 500 to the receiving side of the short-range communication module 760, in the sleep mode. Also, the interrupt detector 734 may release the sleep mode by waking up the controller 770 if the interrupt signal is sensed as much as the predetermined number of times or more within the preset time. And, the controller 770 may control the short-range communication module 760 to transmit the signal for accepting short-range communication connection with the mobile terminal 500 to the mobile terminal 500. As a result, short-range communication may be connected automatically between the mobile terminal 500 and the sound bar 1000.

The user may enjoy contents contained in the mobile terminal 500 or contents received in the mobile terminal 500 through the sound bar 1000 to which short-range communication is connected. The controller 580 of the mobile terminal 500 may control the wireless communication unit 510 to transmit the streaming signal to the sound bar 1000 in accordance with a user command. The controller 770 of the sound bar 1000 may control the short-range communication module 760 to receive the streaming signal (for example, audio streaming signal) transmitted from the mobile terminal 500 and output the received streaming signal through the audio output module 710.

According to this embodiment, if the user selects the external device desired to be connected with the mobile terminal 500, it is advantageous in that short-range communication is automatically connected between the mobile terminal 500 and the external device even if the external device is in the sleep mode.

FIG. 11 is a diagram illustrating another example of a method for automatically connecting short-range communication between a first device and a second device when a specific event occurs in the first device in accordance with one embodiment of the present invention.

In this embodiment, it is assumed that the first device is a mobile terminal 500 described with reference to FIG. 5, and the second device is a sound bar 1000. The user may enable an automatic connection function of short-range communication among functions of the sound bar 1000. The automatic connection function of short-range communication refers to a function for automatically connecting short-range communication between the sound bar 1000 and the external device without any separate user action if the sound bar is in the state of the sleep mode, as described above. And, the sound bar 1000 is currently in the state of the sleep mode.

The controller 580 of the mobile terminal 500 may transmit the signal for short-range communication connection to the external device during occurrence of a specific event.

For example, the user may execute a specific application related to short-range communication in the mobile terminal 500. For example, the specific application may be a remote controller application for controlling the external device connected with the mobile terminal 500 through short-range communication. The controller 580 of the mobile terminal 500 may executes the remote controller application on the screen of the display unit 541 of the mobile terminal 500 if a command for selecting an icon 1110 of the remote controller application is sensed. Also, if the command for selecting the icon 1110 of the remote controller application is sensed, the controller 580 may consider that the specific event has occurred and control the wireless communication unit 510 to transmit the signal for short-range communication connection to a specific external device (for example, the sound bar 1000) having a history of short-range communication connection with the mobile terminal 500 by using the remote controller application. For example, the specific external device may be the external device having a history of most recent short-range communication connection with the mobile terminal 500 using the remote controller application or the external device having a history of most frequent short-range communication connection with the mobile terminal 500 within a preset time using the remote controller application, or may be the external device previously designated by the user. The memory 570 of the mobile terminal 500 may store information on the external device having a history of short-range communication connection with the mobile terminal. In accordance with the embodiment, the controller 580 may output a guide message indicating that short-range communication is automatically connected with the specific external device, to the display unit 541.

FIG. 12 is a diagram illustrating an example of a guide message output to a display unit in a second device according to one embodiment of the present invention.

In accordance with the embodiment, the controller 580 may output a guide message 1210, which indicates that short-range communication is automatically connected with the specific external device, to the display unit 541 while the signal for short-range communication connection is being transmitted to the specific external device (for example, the sound bar 1000). If the user does not desire short-range communication connection with the specific external device, the user may quit an attempt of short-range communication connection with the specific external device by selecting a connection cancelation menu 1211 included in the guide message 1210.

Referring to FIG. 11 again, the interrupt detector 734 of the sound bar 1000 senses the interrupt signal for short-range communication connection, which is transmitted from the mobile terminal 500 to the receiving side of the short-range communication module 760, in the sleep mode. Also, the interrupt detector 734 may release the sleep mode by waking up the controller 770 if the interrupt signal is sensed as much as the predetermined number of times or more within the preset time. And, the controller 770 may control the short-range communication module 760 to transmit the signal for accepting short-range communication connection with the mobile terminal 500 to the mobile terminal 500. As a result, short-range communication may be connected automatically between the mobile terminal 500 and the sound bar 1000.

The user may control functions of the sound bar 1000 by using the remote controller application. The controller of the mobile terminal 500 may transmit a control code value corresponding to each function of the sound bar to the sound bar 100 through the wireless communication unit 110, and the controller 770 of the sound bar 1000 may control a predetermined function in accordance with the transmitted control code value.

According to this embodiment, if the user executes a specific application related to short-range communication, it may be regarded that the user is intended to control a predetermined device through short-range communication, whereby user convenience may be improved.

FIG. 13 is a diagram illustrating still another example of a method for automatically connecting short-range communication between a first device and a second device when a specific event occurs in the first device in accordance with one embodiment of the present invention.

In this embodiment, it is assumed that the first device is a mobile terminal 500 described with reference to FIG. 5, and the second device is a sound bar 1000. The user may enable an automatic connection function of short-range communication among functions of the sound bar 1000. The automatic connection function of short-range communication refers to a function for automatically connecting short-range communication between the sound bar 1000 and the external device without any separate user action if the sound bar is in the state of the sleep mode, as described above. And, the sound bar 1000 is currently in the state of the sleep mode.

The controller 580 of the mobile terminal 500 may transmit the signal for short-range communication connection to the external device during occurrence of a specific event.

For example, the controller 580 of the mobile terminal 500 may control the wireless communication unit 510 to transmit the signal for short-range communication connection to the external device (for example, the sound bar 1000) having a history of short-range communication connection with the mobile terminal 500 if detachment of an earphone 1300 connected to the interface unit 160 is sensed while a specific application is being executed. For example, the specific application is the application related to short-range communication, and may be the remote controller application for controlling the external device connected with the mobile terminal 500 through short-range communication. If detachment of the earphone 1300 is sensed in a state that the remote controller application is executed, the controller 580 may consider that the specific event has occurred, and may control the wireless communication unit 510 to transmit the signal for short-range communication connection to the external device (for example, the sound bar 1000) having a history of short-range communication connection with the mobile terminal 500 by using the remote controller application. For example, the specific external device may be the external device having a history of most recent short-range communication connection with the mobile terminal 500 using the remote controller application or the external device having a history of most frequent short-range communication connection with the mobile terminal 500 within a preset time using the remote controller application, or may be the external device previously designated by the user. The remote controller application may be executed on the foreground or the background.

In accordance with the embodiment, the controller 580 may consider that the specific event has occurred when the remote controller application is executed after detachment of the earphone 1300 is sensed, and may control the wireless communication unit 510 to transmit the signal for short-range communication connection to the specific external device (for example, the sound bar 1000) having a history of short-range communication connection with the mobile terminal 500 by using the remote controller application.

If the user detaches the earphone 1300 from the mobile terminal 500, it may be understood that the user intends to enjoy audio contents by using another output means not the earphone 1300. Especially, if the user detaches the earphone 1300 in a state that a specific application related to short-range communication is executed, or executes the specific application related to short-range communication after detaching the earphone 1300, it may be more apparent to be understood that the user intends to enjoy audio contents by using another output means not the earphone 1300.

In accordance with the embodiment, if connection of the earphone 1300 to the interface unit 560 is sensed again, the controller 580 of the mobile terminal 500 may release short-range communication connection with the sound bar 1000. This is because that the user intends to again listen to music by using the earphone 1300. Of course, the controller 580 of the mobile terminal 500 may continue to maintain short-range communication connection with the sound bar 1000 as far as the user does not input a definite command even if connection of the earphone 1300 to the interface unit 560 is sensed.

FIG. 14 is a diagram illustrating further still another example of a method for automatically connecting short-range communication between a first device and a second device when a specific event occurs in the first device in accordance with one embodiment of the present invention.

In this embodiment, it is assumed that the first device is a mobile terminal 500 described with reference to FIG. 5, and the second device is a sound bar 1000. The user may enable an automatic connection function of short-range communication among functions of the sound bar 1000. The automatic connection function of short-range communication refers to a function for automatically connecting short-range communication between the sound bar 1000 and the external device without any separate user action if the sound bar is in the state of the sleep mode, as described above. And, the sound bar 1000 is currently in the state of the sleep mode.

The controller 580 of the mobile terminal 500 may transmit the signal for short-range communication connection to the external device during occurrence of a specific event.

For example, the controller 580 of the mobile terminal 500 may control the wireless communication unit 510 to transmit the signal for short-range communication connection to the specific external device (for example, the sound bar 1000) having a history of short-range communication connection with the mobile terminal 500 if detachment of an earphone 1300 connected to the interface unit 160 is sensed while a specific application is being executed. For example, the specific application may be a contents play application (for example, music play application). If detachment of the earphone 1300 is sensed in a state that the contents play application is executed, the controller 580 may consider that the specific event has occurred, and may control the wireless communication unit 510 to transmit the signal for short-range communication connection to the specific external device (for example, the sound bar 1000) having a history of short-range communication connection with the mobile terminal 500. For example, the specific external device may be the external device having a history of most recent short-range communication connection with the mobile terminal 500 or the external device having a history of most frequent short-range communication connection with the mobile terminal 500 within a preset time, or may be the external device previously designated by the user. The contents play application may be executed on the foreground or the background.

In accordance with the embodiment, the controller 580 may consider that the specific event has occurred when the contents play application is executed after detachment of the earphone 1300 is sensed, and may control the wireless communication unit 510 to transmit the signal for short-range communication connection to the specific external device (for example, the sound bar 1000).

If short-range communication connection is established between the mobile terminal 500 and the sound bar 1000, the controller of the mobile terminal 500 may control the wireless communication unit 510 to transmit a streaming signal of a content played through the contents play application to the sound bar 1000. The controller 770 of the sound bar 1000 may control the short-range communication module to receive the transmitted streaming signal and output the received streaming signal through the audio output module 710.

If the user detaches the earphone 1300 while listening to music through the earphone connected to the mobile terminal 500 or plays music after detaching the earphone 1300, it may be understood that the user intends to listen to music by using any other output means (for example, the sound bar 1000) not the earphone 1300.

In accordance with the embodiment, if connection of the earphone 1300 to the interface unit 560 is sensed again, the controller 580 of the mobile terminal 500 may release short-range communication connection with the sound bar 1000. This is because that the user intends to again listen to music by using the earphone 1300. Of course, the controller 580 of the mobile terminal 500 may continue to maintain short-range communication connection with the sound bar 1000 as far as the user does not input a definite command even if connection of the earphone 1300 to the interface unit 560 is sensed.

FIG. 15 is a diagram illustrating further still another example of a method for automatically connecting short-range communication between a first device and a second device when a specific event occurs in the first device in accordance with one embodiment of the present invention.

In this embodiment, it is assumed that the first device is a mobile terminal 500 described with reference to FIG. 5, and the second device is a sound bar 1000. The user may enable an automatic connection function of short-range communication among functions of the sound bar 1000. The automatic connection function of short-range communication refers to a function for automatically connecting short-range communication between the sound bar 1000 and the external device without any separate user action if the sound bar is in the state of the sleep mode, as described above. And, the sound bar 1000 is currently in the state of the sleep mode.

The controller 580 of the mobile terminal 500 may transmit the signal for short-range communication connection to the external device during occurrence of a specific event.

For example, the controller 580 of the mobile terminal 500 may control the wireless communication unit 510 to transmit the signal for short-range communication connection to the specific external device (for example, the sound bar 1000) having a history of short-range communication connection with the mobile terminal 500 if short-range communication connection with a separate device connected with the mobile terminal through short-range communication is released while a specific application is being executed. For example, the separate device may be a Bluetooth earphone 1500, and the specific application may be a contents play application (for example, music play application). If detachment of the Bluetooth earphone 1500 is sensed in a state that the contents play application is executed, the controller 580 may consider that the specific event has occurred, and may control the wireless communication unit 510 to transmit the signal for short-range communication connection to the specific external device (for example, the sound bar 1000) having a history of short-range communication connection with the mobile terminal 500. For example, the specific external device may be the external device having a history of most recent short-range communication connection with the mobile terminal 500 or the external device having a history of most frequent short-range communication connection with the mobile terminal 500 within a preset time, or may be the external device previously designated by the user. The contents play application may be executed on the foreground or the background.

In accordance with the embodiment, the controller 580 may consider that the specific event has occurred when the contents play application is executed after short-range communication connection with the Bluetooth earphone 1500 is released, and may control the wireless communication unit 510 to transmit the signal for short-range communication connection to the specific external device (for example, the sound bar 1000).

Also, in accordance with the embodiment, the controller 580 may control the wireless communication unit 510 to transmit the signal for short-range communication connection to the Bluetooth earphone 1500 if short-range communication connection with the Bluetooth earphone 1500 is released while the specific application is being executed, or if the specific application is executed after short-range communication connection with the sound bar 1000 is released.

If short-range communication connection is established between the mobile terminal 500 and the sound bar 1000, the controller of the mobile terminal 500 may control the wireless communication unit 510 to transmit a streaming signal of a content played through the contents play application to the sound bar 1000 not the Bluetooth earphone 1500. The controller 770 of the sound bar 1000 may control the short-range communication module 760 to receive the transmitted streaming signal and output the received streaming signal through the audio output module 710.

If the user releases short-range communication connection with the Bluetooth earphone 1500 while listening to music through the Bluetooth earphone 1500 or plays music after releasing short-range communication connection with the Bluetooth earphone 1500, it may be understood that the user intends to listen to music by using any other output means (for example, the sound bar 1000) not the Bluetooth earphone 1500.

FIG. 16 is a diagram illustrating an example of a guide message, which may be output to a display unit when a specific event occurs in a first device according to one embodiment of the present invention. Repeated description of the description made with reference to FIGS. 10 to 15 will be omitted, and a difference from the description of FIGS. 10 to 15 will be described hereinafter.

The controller 580 of the mobile terminal 500 may output a guide message 1600, which includes a list of external devices having a history of short-range communication connection with the mobile terminal 500, to the display unit 541 when a specific event described with reference to FIGS. 10 to 15 occurs, and may transmit a signal for short-range communication connection to a specific external device selected by the user.

FIG. 17 is a flow chart illustrating an example of a method for releasing short-range communication when the short-range communication is automatically connected between a first device and a second device in accordance with one embodiment of the present invention.

It is assumed that short-range communication connection is automatically established between the first device 610 and the second device 700 in accordance with the aforementioned description (S1710).

The first device 610 may transmit a streaming signal and/or a control signal to the second device 700 through short-range communication (S1720). The streaming signal may include at least one of an audio signal, a graphic signal, an image signal, a moving picture signal, and a video signal, and the control signal may include a signal for controlling the streaming signal in the second device 700.

The controller 770 of the second device 700 may output the streaming signal received from the first device 610 through the short-range communication module 760 and control a function related to the output streaming signal by using the received control signal (S1730).

If a predetermined condition is satisfied, the controller 770 of the second device 700 may control the short-range communication module 760 to release short-range communication connection with the first device 610 (S1740). For example, if a predetermined condition is satisfied, the controller 770 may switch the short-range communication function to a disabled state.

For example, the predetermined condition may include at least one of a condition that a content signal is not received from the first device 610 for a preset time or more, a condition that a play of the content signal received from the first device 610 ends, a condition that the short-range communication function is switched to a disabled state through the environment setup menu of short-range communication in the embodiment of FIG. 10, a condition that execution of a specific application related to the short-range communication ends in the embodiment of FIG. 11, a condition that reconnection of the earphone 1300 in the embodiments of FIGS. 13 and 14 is sensed, and a condition that short-range communication with the separate device 1500 is reconnected in the embodiment of FIG. 15.

The controller 770 of the second device 700 may automatically turn off the second device 700 if short-range communication connection with the first device 610 is released. Since the sleep mode of the second device 700 is released for automatic short-range communication connection with the first device 610, if short-range communication connection with the first device 610 is released, turning-off of the second device 700 may adapt to intention of the user.

FIG. 18 is a flow chart illustrating another example of a method for releasing short-range communication when the short-range communication is automatically connected between a first device and a second device in accordance with one embodiment of the present invention.

It is assumed that short-range communication connection is automatically established between the first device 610 and the second device 700 in accordance with the aforementioned description (S1810).

The controller 770 of the second device 700 senses a first command for switching a first mode for outputting a content signal (for example, streaming signal) received from the first device 610 through the short-range communication module 760 to a second mode related to a specific function of the second device 700 (S1820). For example, the second mode related to the specific function of the second device 700 may be a mode that may use a CD player function or a radio function if the second device 700 is the sound bar 1000.

The controller 770 may switch the first mode to the second mode in accordance with the sensed first command (S1830). Also, the controller 770 may control the short-range communication module 760 to release short-range communication connection with the first device 610 (S1840). If the mode of the second device 700 is switched from the first mode to the second mode by the user, it may be understood that the user intends not to use the first device 610 any longer.

In this embodiment, if short-range communication connection with the first device 610 is released as described with reference to FIG. 17, a function of automatically turning off the second device 700 may be released or may not be used.

Meanwhile, the controller 770 may sense a second command for switching the second mode to the first mode (S1850). Also, the controller 770 may again switch the mode to the first mode in accordance with the sensed second command.

Also, the controller 770 may control the short-range communication module 760 to again perform short-range communication connection with the first device 610 (S1870). The controller 770 may control the short-range communication module 760 to transmit a signal for short-range communication connection to the first device 610 and receive a signal for accepting short-range communication connection from the first device 610. The memory 570 may store information related to the first device 610 having a history of short-range communication connection with the second device 700. If the mode of the second device 700 is switched from the second mode to the first mode by the user, it may be understood that the user intends to again listen to the content transmitted from the first device 610 through short-range communication by using the second device 700.

FIG. 19 is a flow chart illustrating an example of a method for maintaining short-range communication when the short-range communication is automatically connected between a first device and a second device in accordance with one embodiment of the present invention.

It is assumed that short-range communication connection is automatically established between the first device 610 and the second device 700 in accordance with the aforementioned description (S1910).

The controller 770 of the second device 700 senses a command for switching a first mode for outputting a content signal (for example, streaming signal) received from the first device 610 through the short-range communication module 760 to a second mode related to a specific function of the second device 700 (S1920). For example, the second mode related to the specific function of the second device 700 may be a mode that may use a CD player function or a radio function if the second device 700 is the sound bar 1000. At this time, unlike the description of FIG. 18, the controller 770 may continue to maintain short-range communication connection with the first device 610 even in the second mode. For example, the controller 770 may disable a function of automatically releasing short-range communication connection if the mode of the second device 700 is switched to a mode of a function irrespective of short-range communication connection.

Meanwhile, the controller 770 senses retransmission of the content signal (for example, streaming signal) transmitted from the first device 610 through the short-range communication module 760, in the second mode after transmission of the content signal is stopped (S1940).

If the controller 770 senses that the content signal is retransmitted from the first device 610 through the short-range communication module 760, in the second mode, the controller 770 may again switch the mode of the second device 700 from the second mode to the first mode (S1950). If the content signal is retransmitted from the first device 610 through the short-range communication module 760, it may be understood that the user intends to again enjoy the content transmitted from the first device 610 through short-range communication by using the second device 700. At this time, the controller may again enable the function of automatically releasing short-range communication connection if the mode of the second device 700 is switched to a mode of a function irrespective of short-range communication connection.

The controller 770 may output the content signal from the first device 610 through the short-range communication module 760 (S1960).

According to the aforementioned embodiments, a method for automatically connecting two devices, which are targets for short-range communication, with each other through short-range communication when the devices are in a sleep mode, and an apparatus for the same may be provided. Also, a method for automatically releasing short-range communication connection between two devices if short-range communication is automatically connected between the two devices, or automatically re-connecting short-range communication between the two devices after the short-range communication connection is released, and an apparatus for the same may be provided.

The aforementioned present may be implemented in a recording medium, in which programs are recorded, as a code that can be read by a computer. The recording medium that can be read by the computer includes all kinds of recording media in which data that can be read by the computer system are stored. Examples of the recording medium include a ROM, a RAM, CD-ROM, a magnetic tape, a floppy disk, and an optical data memory. Also, another example of the recording medium may be implemented in a type of carrier wave (for example, transmission through Internet). Also, the computer may include a controller of a terminal. Thus, the above embodiments are to be considered in all respects as illustrative and not restrictive. The scope of the specification should be determined by reasonable interpretation of the appended claims and all change which comes within the equivalent scope of the specification are included in the scope of the specification.

INDUSTRIAL APPLICABILITY

The aforementioned embodiments according to the present invention relate to a method for automatically connecting short-range communication between two devices and an apparatus for the same, and may have industrial applicability.

The invention claimed is:

1. An apparatus comprising:
   a short-range communication module configured to enable short-range communication with an external device;
   an interrupt detector configured to sense an interrupt signal for short-range communication connection, which is received from the external device through the short-range communication module in a sleep mode where a standby power is supplied; and
   a controller,
   wherein the interrupt detector wakes up the controller if the interrupt signal is sensed in the sleep mode,
   wherein the woken-up controller releases the sleep mode and controls the short-range communication module to perform short-range communication connection with the external device, and
   wherein the interrupt signal is received from the external device in response to detachment of an earphone from the external device while a specific application is being executed in the external device.

2. The apparatus according to claim 1, wherein the interrupt detector maintains a wake-up state in the sleep mode.

3. The apparatus according to claim 1, wherein the interrupt detector wakes up the controller if the interrupt signal is sensed in the sleep mode as much as a predetermined number of times or more within a preset time.

4. The apparatus according to claim 1, further comprising an audio output module, wherein the short-range communication module receives a streaming signal from the external device to which the short-range communication is connected, and the controller controls the audio output module to output an audio signal included in the streaming signal.

5. The apparatus according to claim 1, wherein the controller senses a first command for switching a first mode for outputting a streaming signal received from the external device through the short-range communication module to a second mode related to a specific function of the apparatus.

6. The apparatus according to claim 5, wherein the controller controls the short-range communication module to release the short-range communication connection with the external device in accordance with the sensed first command.

7. The apparatus according to claim 6, wherein the controller senses a second command for switching the second mode to the first mode, and controls the short-range communication module to perform the short-range communication connection with the external device in accordance with the sensed second command.

8. The apparatus according to claim 5, wherein the controller switches the current mode to the second mode if the first command is sensed, and maintains the short-range communication connection with the external device even in the second mode.

9. The apparatus according to claim 8, wherein the controller senses the streaming signal received from the external device through the short-range communication module in the second mode, and switches the second mode to the first mode if the streaming signal is sensed in the second mode.

10. The apparatus according to claim 1, wherein the controller turns off the apparatus if the short-range communication connection with the external device is released.

11. A method for automatically connecting short-range communication between two devices, the method comprising:
    transmitting an interrupt signal for short-range communication connection from a first device to a second device;
    sensing the interrupt signal for short-range communication connection, which is transmitted from the first device, in a sleep mode of a second device where a standby power is supplied;
    waking up a controller of the second device if the interrupt signal is sensed in the sleep mode;
    releasing the sleep mode in the second device; and
    transmitting a first signal for accepting a short-range communication connection, from the second device to the first device,
    wherein the method further comprises:
    sensing detachment of an earphone from the first device while a specific application is being executed; and
    transmitting the interrupt signal for short-range communication connection to the second device having a history of short-range communication connection, from the first device if detachment of the earphone is sensed.

12. The method according to claim 11, wherein the controller of the second device is woken up if the interrupt signal is sensed in the sleep mode as much as a predetermined number of times or more within a preset time.

13. The method according to claim 11, further comprising:
   receiving a streaming signal from the second device to the first device if short-range communication is connected between the second device and the first device; and
   outputting the received streaming signal from the second device.

14. The method according to claim 11, further comprising sensing a first command for switching a first mode for outputting a streaming signal received from the first device to a second mode related to a specific function of the second device, in the second device.

15. The method according to claim 14, further comprising releasing the short-range communication connection with the first device in accordance with the sensed first command in the first device.

16. The method according to claim 15, further comprising:
   sensing a second command for switching the second mode to the first mode, in the second device; and
   re-connecting short-range communication between the second device and the first device.

17. The method according to claim 14, further comprising switching the current mode to the second mode if the first command is sensed in the second device, wherein the short-range communication connection with the first device is maintained in the second mode.

18. The method according to claim 17, further comprising:
   receiving the streaming signal from the second device through the short-range communication in the second mode of the second device; and
   switching the second mode to the first mode if the streaming signal is sensed in the second mode of the second device.

19. A mobile device comprising:
   a short-range communication module configured to enable short-range communication with an external device;
   an interface configured to have a wired or wireless connection with an earphone; and
   a controller configured to:
   in response to disconnection of the earphone from the interface while a specific application is being executed, transmit an interrupt signal to wake up the external device for short-range communication connection to the external device, which is in a sleep mode where a standby power in supplied,
   receive an acceptance signal for accepting short-range communication connection with the external device from the external device,
   establish the short-range communication connection with the external device, and
   transmit a streaming signal to the external device via the short-range communication connection.

* * * * *